United States Patent [19]

Kawamura

[11] Patent Number: 4,493,302
[45] Date of Patent: Jan. 15, 1985

[54] FUEL INJECTION TIMING CONTROL SYSTEM FOR AN INTERNAL COMBUSTION ENGINE

[75] Inventor: Yoshihisa Kawamura, Yokosuka, Japan

[73] Assignee: Nissan Motor Company, Limited, Japan

[21] Appl. No.: 454,024

[22] Filed: Dec. 28, 1982

[30] Foreign Application Priority Data

Feb. 1, 1982 [JP] Japan .................................. 57-13355
Feb. 3, 1982 [JP] Japan .................................. 57-14755

[51] Int. Cl.$^3$ ............................................ F02M 59/20
[52] U.S. Cl. ..................................... 123/357; 123/501; 123/502
[58] Field of Search ............... 123/357, 358, 359, 502, 123/501

[56] References Cited

U.S. PATENT DOCUMENTS

| | | | |
|---|---|---|---|
| 4,265,200 | 5/1981 | Wessel et al. | 123/501 |
| 4,355,621 | 10/1982 | Yasuhara | 123/502 |
| 4,395,905 | 8/1983 | Fujimori et al. | 123/357 |
| 4,417,554 | 11/1983 | Dinger | 123/357 |

FOREIGN PATENT DOCUMENTS

| | | | |
|---|---|---|---|
| 52531 | 5/1981 | Japan | 123/501 |
| 146023 | 11/1981 | Japan | 123/357 |
| 97024 | 6/1982 | Japan | 123/502 |

Primary Examiner—Magdalen Y. C. Moy
Attorney, Agent, or Firm—Lowe, King, Price & Becker

[57] ABSTRACT

A fuel injection timing control system for an internal combustion engine into which fuel is intermittently injected, includes a closed-loop fuel injection timing control system, a first device, fluidly-driven, for varying the fuel injection timing, and a second device for adjustably determining the response time and the stability of the closed-loop control system. The first device constitutes a part of the closed-loop control system. The second device constitutes another part of the closed-loop control system. Sensed is a condition of the working fluid for the first device which can influence the response time and the stability of the closed-loop control system. The second device is adjusted in accordance with the sensed working fluid condition so as to reduce the influence of the working fluid condition on the response time and the stability of the closed-loop control system.

13 Claims, 16 Drawing Figures

FUEL INJECTION TIMING CONTROL SYSTEM FOR AN INTERNAL COMBUSTION ENGINE

BACKGROUND OF THE INVENTION

1. Field of the Invention

This invention relates to a fuel injection timing control system for an internal combustion engine, such as a diesel engine, and more particularly to a control system of the closed-loop or feed-back type employing a hydraulically-driven device.

2. Description of the Prior Art

In diesel engines, fuel injection timing needs to be adjusted to match changes in engine rotational speed (rpm) and engine load to achieve optimal engine performance. Closed-loop or feed-back control systems are conventionally used for accurate and stable control. Generally, the closed-loop control system becomes less stable as the response time thereof decreases. Accordingly, a compromise is necessary in setting the response time and the stability of the system.

Some closed-loop control systems for fuel injection timing employ hydraulic devices. The speed of force transmission, i.e., response, of these hydraulic devices depends on the conditions of the working fluid, such as temperature and pressure thereof. As a result, the response time and thus the stability of the over-all closed-loop control system also depends on the conditions of the working fluid. It is, therefore, difficult to keep the characteristics of the system constant as the conditions of working fluid change.

SUMMARY OF THE INVENTION

It is an object of this invention to provide a closed-loop fuel injection timing control system with a hydraulic device for an internal combustion engine which is essentially independent of the conditions of the working fluid in the hydraulic device.

In accordance with this invention, a fuel injection timing control system for an internal combustion engine into which fuel is intermittently injected includes a closed-loop fuel injection timing control system, a first fluid-driven device for varying the fuel injection timing, and a second device for adjustably determining the response time and the stability of the closed-loop control system. The first device constitutes a part of the closed-loop control system. The second device constitutes another part of the closed-loop control system. Sensed is a condition of the working fluid for the first device which can influence the response time and the stability of the closed-loop control system. The second device is adjusted in accordance with the sensed working fluid condition so as to reduce the influence of the working fluid condition on the response time and the stability of the closed-loop control system.

The above and other objects, features and advantages of this invention will be apparent from the following description of preferred embodiments thereof, taken in conjunction with the drawings.

BRIEF DESCRIPTION OF THE DRAWINGS

Like reference characters denote like elements throughout the drawings.

DESCRIPTION OF THE PREFERRED EMBODIMENTS

Figure 1:
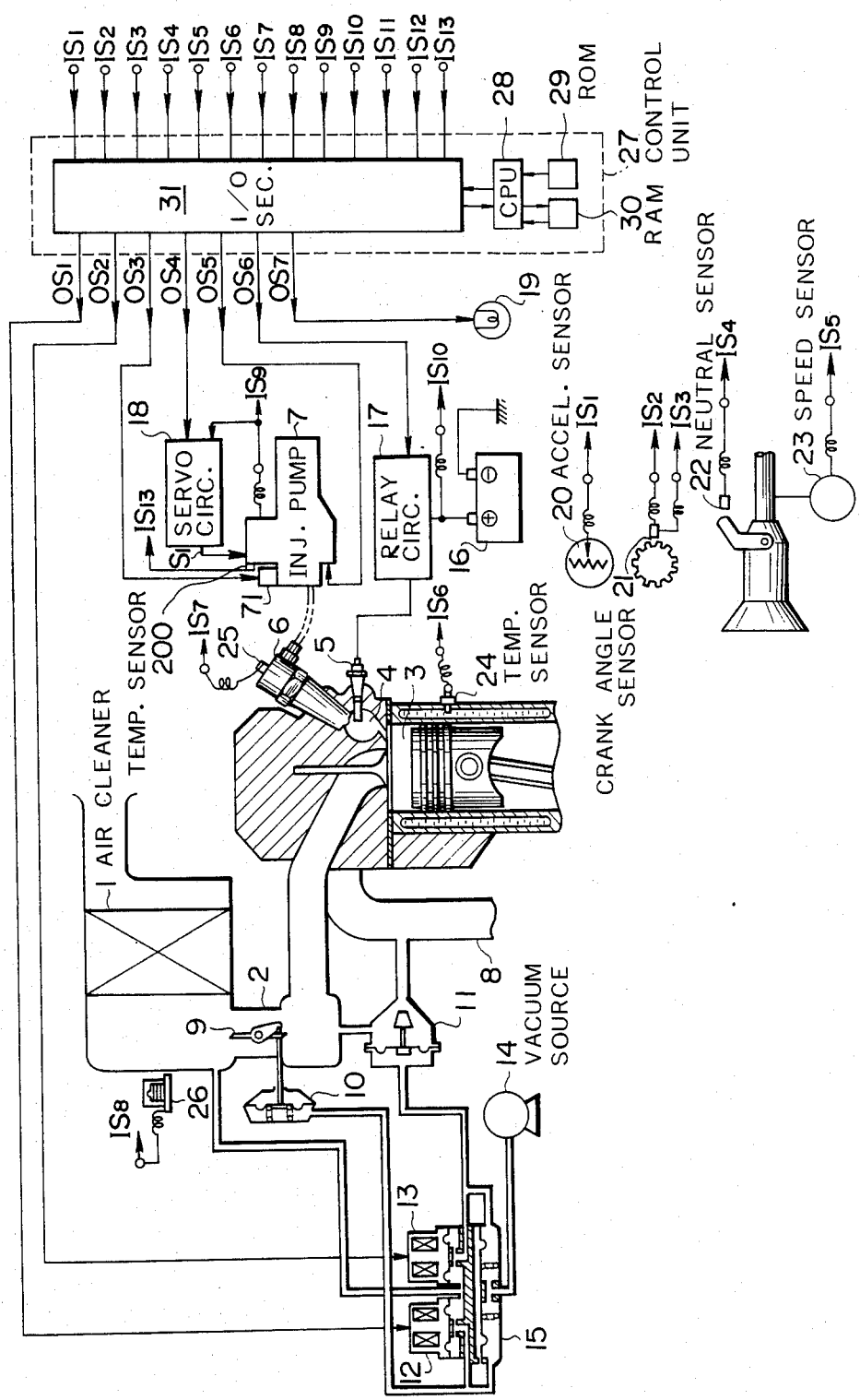
FIG. 1 is a diagram of a diesel engine and associated systems including a fuel injection timing control system according to a first embodiment of this invention.

With reference to FIG. 1, there is shown a diesel engine and associated systems including a fuel injection timing control system according to a first embodiment of this invention.

An air cleaner 1 is installed in an air intake passage 2 leading to main combustion chambers 3, one of which is shown. The main chambers 3 each communicate with an auxiliary or swirl combustion chamber 4, into which a glow plug 5 projects. The outlets of fuel injection nozzles or valves 6, one of which is shown, open into the respective swirl chambers 4. A fuel injection pump 7 supplies fuel to the swirl chambers 4 and thus main chambers 3 via the fuel injection nozzles 6.

An exhaust passage 8 extends from the main combustion chambers 3. A throttle valve 9 is located in the intake passage 2 downstream of the air cleaner 1. A pressure-responsive vacuum actuator 10 drives the throttle valve 9. An exhaust gas recirculation control valve 11 is located in a passage connecting the exhaust passage 8 and the intake passage 2 downstream of the throttle valve 9. The control valve 11 has a pressure-responsive vacuum actuator to drive the valve member thereof. An electrically-driven or electromagnetic valve 12 is provided along a passage interconnecting the actuator 10 and the intake passage 2 upstream of the throttle valve 9 but downstream of the air cleaner 1 to selectively allow and interrupt the supply of atmospheric pressure to the actuator 10. Another electrically-driven or electromagnetic valve 13 is provided along a passage interconnecting the actuator of the control valve 11 and the intake passage 2 upstream of the throttle valve 9 but downstream of the air cleaner 1 to selectively allow and interrupt the supply of atmospheric pressure to the actuator of the control valve 11. A vacuum source 14, such as a vacuum pump, communicates with the passage between the actuator 10 and the electromagnetic valve 12, and with the passage between the actuator of the control valve 11 and the electromagnetic valve 13 via a pressure or vacuum regulating valve 15 to supply regulated vacuum pressure to the actuator 10 and the actuator of the control valve 11.

A battery 16 is connected to the glow plug 5 to energize the latter. A relay circuit 17 is disposed along the connection of the battery 16 to the glow plug 5 to control energization of the glow plug 5. A bulb or light 19 is provided to indicate energization of the glow plug 5.

A servo circuit 18 is associated with the fuel injection pump 7 to control the rate of fuel injection into the combustion chambers 3 and 4 via the fuel injection pump 7 and the fuel injection nozzles 6.

An accelerator position sensor 20 is associated with an accelerator pedal to generate a signal $IS_1$ indicative of the position of the accelerator pedal, that is, the degree of depression of the accelerator pedal. The sensor 20 includes a potentiometer mechanically linked to the accelerator pedal to output the voltage signal $IS_1$ related to the position of the accelerator pedal.

A crank angle sensor 21 is associated with the crankshaft or the camshaft of the engine to generate short-pulse signals $IS_2$ and $IS_3$ indicative of predetermined angles of engine revolution. For example, the pulses of the signal $IS_2$ are outputted at predetermined crankshaft angular positions spaced at regular intervals of 120° in the case of a six-cylinder engine. In contrast, the pulses of the signal $IS_3$ are outputted at regular intervals of 1° in engine revolution. In more detail, the sensor 21 comprises the combination of a toothed disc and two magnetic pickups. In this case, the disc is mounted on the crankshaft or the camshaft of the engine, and the pickups are fixedly placed near the disc. The teeth of the disc belong to two groups, one for the 1° pulses and the other for the 120° pulses. The first pickup is designed to generate an alternating voltage corresponding to the 1° pulse signal $IS_3$. The second pickup is designed to generate an alternating voltage corresponding to the 120° pulse signal $IS_2$. The sensor 21 also includes two waveform shaping circuits to convert the alternating voltages into the corresponding pulse signals $IS_2$ and $IS_3$.

A neutral position sensor 22 is associated with an engine power transmission to generate a signal $IS_4$ indicative of whether or not the transmission is in the neutral position. The sensor 22 includes a switch actuated by the gear shift lever of the transmission. A rotational speed sensor 23 is associated with the output shaft of the transmission to generate a signal $IS_5$ indicative of the rotational speed of the output shaft, that is, the vehicle speed in the case of a vehicular engine.

A temperature sensor 24 is attached to the engine in such a way that the sensing section of the sensor 24 is exposed to engine coolant. The sensor 24 generates a signal $IS_6$ indicative of the temperature of the engine coolant.

A lift sensor 25 is normally associated with each of the fuel injection nozzles 6 to detect lift of the valve member thereof. The sensors 25 generate a common signal $IS_7$ indicative of each fuel injection stroke, and particularly of the time of the onset or start of each fuel injection stroke.

A density sensor 26 is exposed to the atmosphere to generate a signal $IS_8$ indicative of the density of the atmosphere which depends on the temperature and the pressure thereof.

The fuel injection pump 7 has a sensor, described hereinafter, which generates a signal $IS_9$ indicative of the position of a control sleeve determining the fuel injection quantity of each fuel injection stroke. The control sleeve is also described hereinafter.

A connection to the battery 16 provides a signal $IS_{10}$ indicative of the voltage across the battery 16.

A control unit 27 includes a central processing unit (CPU) 28, a read only memory (ROM) 29, a read/write or random access memory (RAM) 30, and an input/output (I/O) section 31. The I/O section 31 includes an input/output circuit and a novel closed-loop fuel injection timing control circuit, described hereinafter. The processing unit 28 is connected to the memories 29 and 30, and the input/output circuit to constitute a microcomputer system.

The I/O section 31 is connected to the foregoing sensors and the battery connection to receive the signals $IS_1$, $IS_2$, $IS_3$, $IS_4$, $IS_5$, $IS_6$, $IS_7$, $IS_8$, $IS_9$, and $IS_{10}$. Note that the connection of the I/O section 31 to the sensors and the battery connection is omitted in the drawing for clarity. The I/O section 31 is also connected to a starter switch (not shown) to receive a signal $IS_{11}$ therefrom indicating whether or not an engine starting motor is energized. The I/O section 31 is also connected to a glow switch (not shown) to receive a signal $IS_{12}$ therefrom indicating whether or not the glow plugs 5 are energized. The I/O section 31 is additionally connected to a temperature sensor 200, which is attached to the fuel injection pump 7 in such a manner that the sensing element thereof is exposed to fuel in the pump 7. The sensor 200 generates a signal $IS_{13}$ indicative of the temperature of fuel in the pump 7. The I/O section 31 receives the signal $IS_{13}$ from the sensor 200. The control unit 27 generates control signals $OS_1$, $OS_2$, $OS_3$, $OS_4$, $OS_5$, $OS_6$, and $OS_7$ in response to the signals $IS_1$, $IS_2$, $IS_3$, $IS_4$, $IS_5$, $IS_6$, $IS_7$, $IS_8$, $IS_9$, $IS_{10}$, $IS_{11}$, $IS_{12}$, and $IS_{13}$. The control signals $OS_1$, $OS_2$, $OS_3$, $OS_4$, $OS_5$, $OS_6$, and $OS_7$ are outputted via the I/O section 31 and are generally intended to control the engine optimally.

The I/O section 31 is connected to the electromagnetic valves 12 and 13 to supply the control signals $OS_1$ and $OS_2$ thereto, respectively. The control signals $OS_1$ and $OS_2$ are in the form of pulse trains. The higher levels of the control signals $OS_1$ and $OS_2$ energize the electromagnetic valves 12 and 13 and thus open them. The lower levels of the control signals $OS_1$ and $OS_2$ de-energize the electromagnetic valves 12 and 13 and thus close them. When the electromagnetic valves 12 and 13 are opened, air is permitted to enter the actuator 10 and the actuator of the control valve 11 via the valves 12 and 13, raising pressures applied to the actuators. When the electromagnetic valves 12 and 13 are closed, air supply to the actuators is interrupted, lowering pressures applied thereto toward the vacuum pressure defined by the regulating valve 15. As a result, the resultant pressure applied to the actuator 10 depends on the duty cycle of the control signal $OS_1$, so that the position of the throttle valve 9 also depends on the duty cycle of the control signal $OS_1$. Similarly, the resultant pressure applied to the actuator of the control valve 11 depends on the duty cycle of the control signal $OS_2$, so that the position of the control valve 11 also depends on the duty cycle of the control signal $OS_2$. The rate of exhaust gas recirculation depends on the positions of the valves 9 and 11. When the rate of exhaust gas recirculation needs to be changed, the control unit 27 varies the duty cycles of the control signals $OS_1$ and $OS_2$ in a suitable manner.

The I/O section 31 is connected to an electrically-driven or electromagnetic fuel supply cut-off valve 71 to feed the control signal $OS_3$ thereto. The cut-off valve 71 is attached to the fuel injection pump 7 to selectively block and open a fuel feed line in the pump 7. The control signal $OS_3$ takes a binary form with higher and lower levels thereof energizing and de-energizing the cut-off valve 71 respectively. Energizing the cut-off valve 71 causes it to open, thereby allowing fuel supply to the combustion chambers 3 and 4. De-energizing the cut-off valve 71 causes it to close, thereby interrupting the fuel supply to the combustion chambers 3 and 4. When the engine needs to be stopped, the control unit 27 changes the control signal $OS_3$ to the lower level to interrupt the fuel supply to the engine.

The I/O section 31 is connected to the servo circuit 18 to feed the control signal $OS_4$ thereto. The servo circuit 18 is connected to the control sleeve position sensor in the fuel injection pump 7 to receive the signal $IS_9$ indicative of the position of the control sleeve determining the fuel injection quantity of each fuel injection stroke. The servo circuit 18 generates a control signal $S_1$ in response to the signals $OS_4$ and $IS_9$. The servo circuit 18 is connected to an actuator (described hereinafter) to feed the control signal $S_1$ thereto. The actuator is designed to drive the control sleeve in response to the control signal $S_1$. The servo circuit 18 controls the position of the control sleeve via the control signal $S_1$ in such a way as to equalize the control sleeve position signal $IS_9$ and the control signal $OS_4$, which represents the required position of the control sleeve, that is, the required fuel injection quantity of each fuel injection stroke, which is determined by the control unit 27.

The I/O section 31 is connected to a fuel injection timing adjustment mechanism (described in more detail later) in the fuel injection pump 7 to supply the control signal $OS_5$ thereto. The control unit 27 controls the timing adjustment mechanism via the control signal $OS_5$ in response to the signal $IS_7$ indicative of the start of the fuel injection stroke by using a closed-loop or feedback technique.

The I/O section 31 is connected to the glow relay 17 to feed the control signal $OS_6$ thereto. The control unit 27 controls the glow relay 17 via the control signal $OS_6$ so as to control energization and de-energization of the glow plugs 5.

The I/O section 31 is connected to the glow light 19 to feed the control signal $OS_7$ thereto. The control unit 27 controls the energization and de-energization of the glow light 19 via the control signal $OS_7$ so that the glow light 19 indicates whether the glow plugs 5 are energized or de-energized. For example, the glow light 19 turns on when the glow plugs 5 are energized, and turns off when the glow plugs 5 are de-energized.

Figure 2:
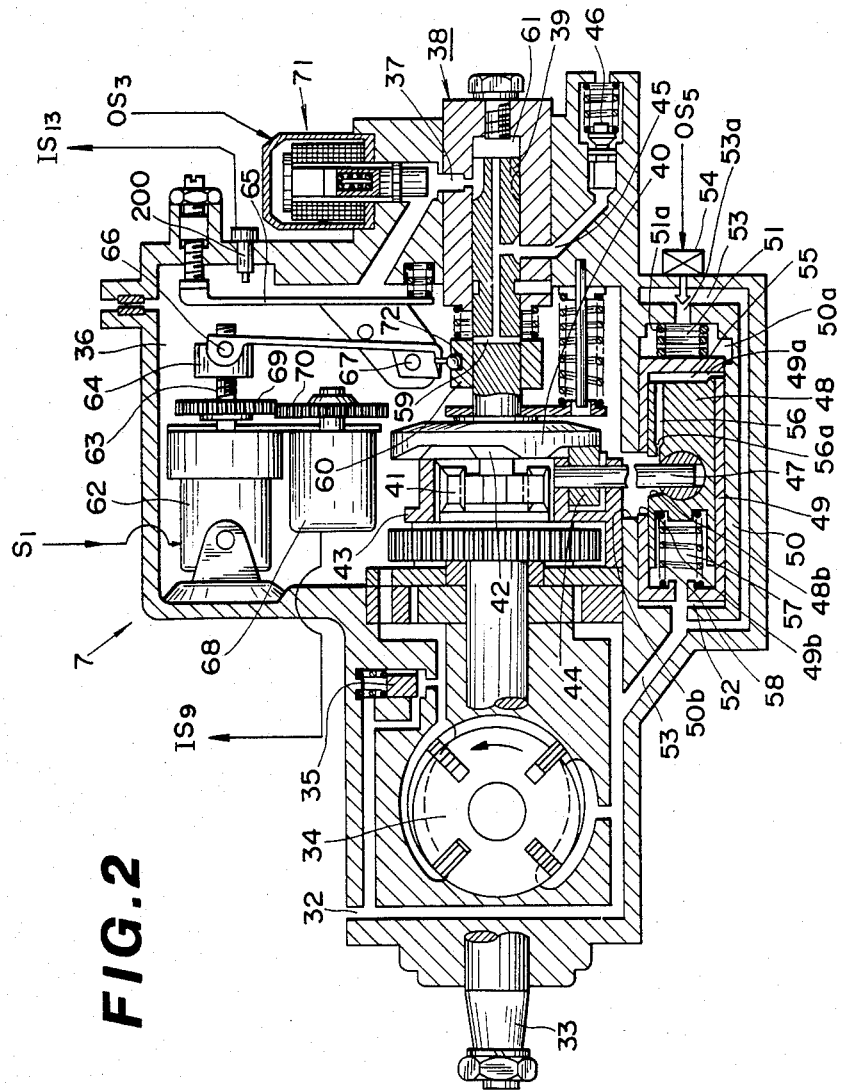
FIG. 2 is a longitudinal section view of the fuel injection pump 7 of FIG. 1.

In FIG. 2 are shown details of the fuel injection pump 7, which includes a fuel inlet 32, a drive shaft 33, and a rotary or vane feed pump 34. Note that the illustration of the feed pump 34 is rotated through 90° about the vertical. The fuel inlet 32 is provided in the housing of the pump 7 and leads to the inlet of the feed pump 34. Fuel is drawn by feed pump 37 from a fuel tank (not shown) to the fuel inlet 32 by means of a suitable fuel line (not shown). The feed pump 34 is rotated or driven via the drive shaft 33, which is connected to the crankshaft of the engine by a coupling which provides that the feed pump 34 rotates at half the speed of rotation of the crankshaft.

A pressure control valve 35 is connected across the feed pump 34 to control the pressure of fuel across the feed pump 34 and more particularly to cause it to be essentially proportional to the engine rotational speed. The outlet of the feed pump 34 communicates with a pump chamber 36 in the housing of the fuel injection pump 7 to supply pressurized fuel to the pump chamber 36. The fuel injection pump 7 includes a high pressure plunger pump 38, which communicates with the pump chamber 36 via an intake port 37 formed in the housing of the fuel injection pump 7. The plunger pump 38 draws fuel from the pump chamber 36 via the intake port 37. In this case, fuel flows through the pump chamber 36 while lubricating moving parts (described hereinafter) in the pump chamber 36.

The high pressure pump 38 includes a plunger 39 secured coaxially to a cam disc 40. The cam disc 40 engages the drive shaft 33 via a key coupling 41 so as to rotate along with the drive shaft 33 but be permitted to move axially relative to the drive shaft 33. The cam disc 40 has identical cam faces 42 spaced in the circumferential direction at regular angular intervals. The number of the cam faces 42 is equal to that of the combustion chambers 3 (see FIG. 1). The cam disc 40 is urged by a spring (not designated) into engagement with identical rollers 44 supported by a roller ring 43 which is stationary in the axial direction with respect to the cam disc 40. The rollers 44 are spaced circumferentially in a manner corresponding to that of the cam faces 42. As the cam faces 42 pass over the rollers 44, the cam disc 40 and the plunger 39 reciprocate axially within a predetermined range defined by the profiles of the cam faces 42. In this way, the plunger 39 reciprocates axially while rotating. The axial reciprocation of the plunger 39 causes the high pressure pump 38 to draw fuel thereinto via the intake port 37 and drive highly pressurized fuel to delivery ports 45 formed in the housing of the fuel injection pump 7. The delivery ports 45 lead to the respective fuel injection nozzles 6 (see FIG. 1) via check valves 46, so that they can conduct fuel from the plunger pump 38 to the fuel injection nozzles 6. Each axial reciprocation of the plunger 39 comprises a fuel injection stroke of the fuel injection pump 7.

The roller ring 43 can be rotated in the direction of rotation of the cam disc 40. The angular position of the roller ring 43 determines the time in terms of crank angle at which the cam faces 42 encounter the rollers 44, and therefore determines the time of the start of fuel injection stroke in terms of crank angle. In other words, the fuel injection timing depends on the angular position of the roller ring 43.

A driving pin 47 connects the roller ring 43 to a plunger 48 slideably disposed in a cylinder 49. The plunger 48 extends in such a direction that axial movement thereof can cause rotation of the roller ring 43. Note that the illustration of the plunger 48, the cylinder 49, and associated parts are rotated through 90° about the vertical. The cylinder 49 is also slideably disposed in a casing 50 fixed to the housing of the fuel injection pump 7. The adjacent ends of the cylinder 49 and the casing 50 define a fluid chamber 51 within the casing 50, and the opposite adjacent ends thereof define another fluid chamber 52 within the casing 50.

The cylinder 49 has an orifice 49a extending therethrough and communicating with a high pressure chamber 55 defined within the cylinder 49 by the adjacent ends of the plunger 48 and the cylinder 49. The casing 50 defining the fluid chamber 51 has a groove 50a, which can communicate with the orifice 49a when the cylinder 49 is displaced toward the fluid chamber 51 to a preset extent. As a result, the high pressure chamber 55 can communicate with the fluid chamber 51 via the orifice 49a and the groove 50a when the cylinder 49 is displaced toward the fluid chamber 51 to the preset extent. In other words, the orifice 49a can be selectively blocked and opened by the casing 50 in accordance with the position of the cylinder 49 relative to the casing 50. A compression spring 51a disposed in the fluid chamber 51 is seated between the casing 50 and the cylinder 49 to urge the cylinder 49 in the direction of the opposite fluid chamber 52.

The fluid chamber 51 can communicate with the other fluid chamber 52 and the inlet or low-pressure side of the feed pump 34 via a fluid passage 53 formed in the casing 50 and the housing of the fuel injection pump 7. Thus, the fluid chamber 52 also communicates with the inlet of the feed pump 34. The connection of the fluid chamber 51 to the fluid passage 53 comprises an orifice 53a formed in the casing 50. An electrically-driven or electromagnetic valve 54 is provided to selectively block and open the orifice 53a.

The high pressure chamber 55 communicates with the pump chamber 36 via a passage 56 formed in the plunger 48, and openings 48b, 49b, and 50b formed respectively in the plunger 48, the cylinder 49, and the casing 50 or the housing of the fuel injection pump 7. The connection of the passage 56 to the opening 48b and thus to the pump chamber 36 comprises an orifice 56a provided in the plunger 48. In this way, the high pressure chamber 55 is supplied with the pressure or fuel in the pump chamber 36 via the passage 56, the orifice 56a, and the openings 48b, 49b, and 50b. The opposite adjacent ends of the plunger 48 and the cylinder 49 define a low pressure chamber 57 opposite the high pressure chamber 55. The low pressure chamber 57 communicates with the fluid chamber 52 via an opening (not designated) formed through the cylinder 49. Thus, the low pressure chamber 57 communicates with the inlet or low pressure side of the feed pump 34 via the opening, the fluid chamber 52, and the fuel passage 53, so that the chamber 57 is supplied with a relatively low pressure. A compression spring 58 disposed in the low pressure chamber 57 is seated between the plunger 48 and the casing 50 to urge the plunger 48 in the direction of the high pressure chamber 55.

The pressure in the pump chamber 36 varies essentially in proportion to the rotational speed of the feed pump 34 and thus that of the engine. Basically, as the engine rotational speed increases and thus the pressure in the high pressure chamber 55 increases, the plunger 48 is displaced against the force of the spring 58 in the direction of the low pressure chamber 57. The displacement of the plunger 48 toward the low pressure chamber 57 causes the roller ring 43 to rotate in the direction opposite that of rotation of the cam disc 40, thereby advancing the time of the start of fuel injection stroke in terms of crank angle. In this way, the fuel injection timing basically advances as the engine rotational speed increases. Basically, as the engine rotational speed decreases and thus the pressure in the high pressure chamber 55 drops, the spring 58 displaces or returns the plunger 48 in the direction of the high pressure chamber 55. The displacement of the plunger 48 toward the high pressure chamber 55 causes the roller ring 43 to rotate in the opposite direction, thereby retarding the fuel injection timing.

Normal rotation of the cam disc 40 exerts a force on the roller ring 43 that may cause the roller ring 43 to rotate in the same direction, thereby in turn offering a resistance to movement of the plunger 48 toward the low pressure chamber 57. Therefore, the rise of the pressure in the high pressure chamber 55 also causes the cylinder 49 to move in the direction of the fluid chamber 51 against the force of the spring 51a to realize to facilitate expansion of the high pressure chamber 55, so that the high pressure chamber 55 comes into communication with the fluid chamber 51 via the orifice 49a and the groove 50a. In this case, the restricted effective cross-sectional area of the orifice 53a ensures that the pressure in the fluid chamber 51 will remain higher than that in the fluid chamber 52, which communicates with the low pressure side of the feed pump 34 via the passage 53. The pressure in the fluid chamber 51 depends on the effective cross-sectional area of the orifice 53a. Since the displacement of the cylinder 49 depends on the difference in pressure between the chambers 51 and 52, the displacement of the cylinder 49 can be adjusted by changing the effective cross-sectional area of the orifice 53a. The displacement of the plunger 48 is influenced by the displacement of the cylinder 49, because the volumes of the high and the low pressure chambers 55 and 57 are defined by the respective pairs of the adjacent ends of the plunger 48 and the cylinder 49. As a result, the displacement of the plunger 48 can be adjusted by changing the effective cross-sectional area of the orifice 53a.

The control signal $OS_5$ is in the form of a pulse train. The higher level of the control signal $OS_5$ energizes the electromagnetic valve 54 to open the orifice 53a, while the lower level thereof de-energizes the valve 54 to block the orifice 53a. Thus, the duty cycle of the control signal $OS_5$ virtually determines the effective cross-sectional area of the orifice 53a from the point of view of time average. In other words, the time-averaged effective cross-sectional area of the orifice 53a depends on the duty cycle of the control signal $OS_5$. The control unit 27 (see FIG. 1) adjusts the displacement of the plunger 48 via the duty cycle of the control signal $OS_5$ in order to control the fuel injection timing. Note that the position of the plunger 48 relative to the casing 50 or the housing of the fuel injection pump 7 determines the angular position of the roller ring 43 and thus the fuel injection timing.

Operation of the plunger 48 in response to switching on and off the electromagnetic valve 54 will be described in more detail hereafter. When the electromagnetic valve 54 opens the orifice 53a, the fuel or the working fluid flows from the pump chamber 36 through the openings 48b, 49b, and 50b, the orifice 56a, the passage 56, the high pressure chamber 55, the orifice 49a, the groove 50a, the fluid chamber 51, the orifice 53a, and the passage 53 into the low pressure side of the fuel feed pump 34, provided that the orifice 49a is open.

Note that the feed pump 34 supplies the fuel or the working fluid to the pump chamber 36.

In the case where the orifice 49a is open, when the electromagnetic valve 54 blocks the orifice 53a, the fuel is prevented from exiting the fluid chamber 51 via the orifice 53a so that the pressure in the fluid chamber 51 rises. As a result, the cylinder 50 moves toward the opposite fluid chamber 52. Actually, this movement of the cylinder 50 is ensured by the additional admission of the fuel into the fluid chamber 51 via the orifice 49a which induces expansion of the fluid chamber 51. The movement of the cylinder 50 results in movement of the plunger 48 in the same direction, thereby advancing the fuel injection timing.

When the electromagnetic valve 54 returns and thus opens the orifice 53a, fuel exits the fluid chamber 51 via the orifice 53a so that the pressure in the fluid chamber 51 drops. As a result, the cylinder 50 moves toward the fluid chamber 51 against the force of the spring 51a. Actually, this movement of the cylinder 50 is ensured by the depletion of fuel in the fluid chamber 51 via the orifice 53a which induces contraction of the fluid chamber 51. The movement of the cylinder 50 results in movement of the plunger 48 in the same direction, thereby retarding the fuel injection timing.

The frequency of switching the electromagnetic valve 54 on and off and thus that of the control signal $OS_5$ is chosen so that the plunger 48 is stably held at a position determined by the duty cycle of the control signal $OS_5$. Therefore, the fuel injection timing can be adjusted stably by changing the duty cycle of the control signal $OS_5$. Response time of variations in the position of the plunger 48 with respect to variations in the duty cycle of the control signal $OS_5$ depends on the flow rate of fuel or hydraulic working fluid into and out of the fluid chamber 51, since the influence of the electromagnetic valve 54 on the position of the plunger 48 is realized by the fuel flows as described hereinbefore. In general, the speed of fuel flow increases as the temperature of the fuel increases. This is because the coefficient of kinematic viscosity of the fuel increases as the temperature thereof decreases. Thus, the fuel flow rate can be deduced from or indicated by the temperature of the fuel.

To sum up, the feed pump 34, the plunger 48, the cylinder 49, the casing 50, the electromagnetic valve 54, and the associated parts constitute a hydraulically-driven fuel injection timing adjustment mechanism, the working fluid of which is the fuel. The response characteristics of the adjustment mechanism in turn depend on the temperature of fuel in the pump chamber 36.

The fuel injection pump 7 has a control sleeve 60, as mentioned hereinbefore, which is used to adjust the amount of injected fuel. The control sleeve 60 is coaxially, slideably mounted on the plunger 39. The plunger pump 38 includes a working chamber 61, which is defined by the end of the plunger 39 so that the volume of the working chamber 61 varies as the plunger 38 moves axially. The working chamber 61 communicates with the intake port 37 only during the expansion of the working chamber 61 via one of a plurality of axial grooves in the end of the plunger 38 so that the fuel is driven from the pump chamber 36 into the working chamber 61. The plunger 39 has an axial passage and a radial passage, through which the working chamber 61 communicates with one of the delivery ports 45 only during the shrinkage of the working chamber 61 so that the fuel is forced out of the working chamber 61 into the delivery port 45. The forced supply of fuel to the delivery port 45 causes fuel injection via the associated fuel injection nozzle 6 (see FIG. 1). The plunger 39 has a diametrical spill port 59 extending therethrough. The spill port 59 communicates with the working chamber 61 via the axial passage of the plunger 39. The openings of the spill port 59 are located in the pump chamber 36 and can be selectively blocked and opened by the control sleeve 60 in accordance with the relative axial positions thereof. When the plunger 39 moves axially in the direction of shrinking the working chamber 61, first the openings of the spill port 59 are blocked by the control sleeve 60 to allow fuel injection and then the openings of the spill port 59 are opened to return the fuel from the working chamber 61 to the pump chamber 36 via the spill port 59 and the axial passage of the plunger 39. The venting of fuel from the working chamber 61 into the pump chamber 36 results in the end of the fuel injection stroke. In this case, the axial position of the plunger 39 at which the openings of the spill port 59 switch from the blocked to the open condition depends on the axial position of the control sleeve 59, so that the stroke interval of the plunger 39 effecting fuel injection also depends on the axial position of the control sleeve 59. As a result, the axial position of the control sleeve 59 determines the fuel injection quantity of each injection stroke.

An electric servomotor 62 is provided to actuate the control sleeve 60. The servomotor 62 has a threaded shaft 63 on which an axially movable member 64 is mounted. The member 64 has a corresponding threaded hole extending therethrough. The shaft 63 passes through the hole of the member 64, so that the member 64 engages the shaft 63 via the threads. The member 64 is supported in such a manner as to be incapable of rotating along with the shaft 63, and therefore the member 64 moves axially with respect to the shaft 63 as the shaft 63 rotates. A link lever 65 is pivotally supported on the housing of the fuel injection pump 7 via a pin 67 located between the ends of the lever 65. One of the ends of the lever 65 is pivotally connected to the movable member 64 by a pin 66, and the other is pivotally connected to the control sleeve 60 by a ball-and-socket joint 72. The axis of the shaft 63 is parallel to that of the control sleeve 60. As the member 64 moves axially due to rotation of the shaft 63, the lever 65 pivots about the pin 67 and causes the control sleeve 60 to move in the opposite axial direction.

The servomotor 62 is electrically connected to the servo circuit 18 (see FIG. 1) to receive the control signal $S_1$ therefrom. Specifically, the angular position or rotation of the shaft 63 is determined by the control signal $S_1$, which responds to the control signal $OS_4$ and the control sleeve position signal $IS_9$ as described hereinbefore. A potentiometer 68 is provided to sense the angular position of the shaft 63 and thus the axial position of the control sleeve 60. The potentiometer 68 has a shaft on which a gear 70 is mounted. A mating gear 69 meshing with the gear 70 is mounted on the shaft 63. Thus, the potentiometer 68 is actuated by the shaft 63, and generates the voltage signal $IS_9$ indicative of the axial position of the control sleeve 60.

As described hereinbefore, the electromagnetic fuel supply cut-off valve 71 is provided to interrupt fuel injection upon need. The valve 71 is attached to the housing of the fuel injection pump 7 in such a position that the valve 71 can selectively block and open the fuel intake port 37. Blocking the fuel intake port 37 with the valve 71 interrupts the fuel supply from the pump chamber 37 to the working chamber 61, thereby disabling fuel injection. Opening the fuel intake port 37 enables fuel injection. The valve 71 is connected to the control unit 27 (see FIG. 1) to receive the control signal OS$_3$ therefrom, through which the control unit 27 controls the valve 71.

As described hereinbefore, the temperature sensor 200 is provided to sense the temperature of fuel in the fuel injection pump 7. The sensor 200 is attached to the housing of the pump 7 in such a manner that the sensing element thereof projects into the pump chamber 36 to be exposed to the fuel in the pump chamber 36. The sensor 200 includes a thermistor, a resistor, and a d.c. power source electrically connected in series. The thermistor is the sensing element of the sensor 200. The voltage across the thermistor varies with the temperature of fuel, and is outputted as the fuel temperature signal IS$_{13}$. In this case, the voltage of the signal IS$_{13}$ increases as the temperature of fuel decreases. Since the working fluid in the hydraulically-driven fuel injection timing adjustment mechanism is the fuel passing through the pump chamber 36, the signal IS$_{13}$ ultimately indicates the temperature of the working fluid in said mechanism.

Figure 3:
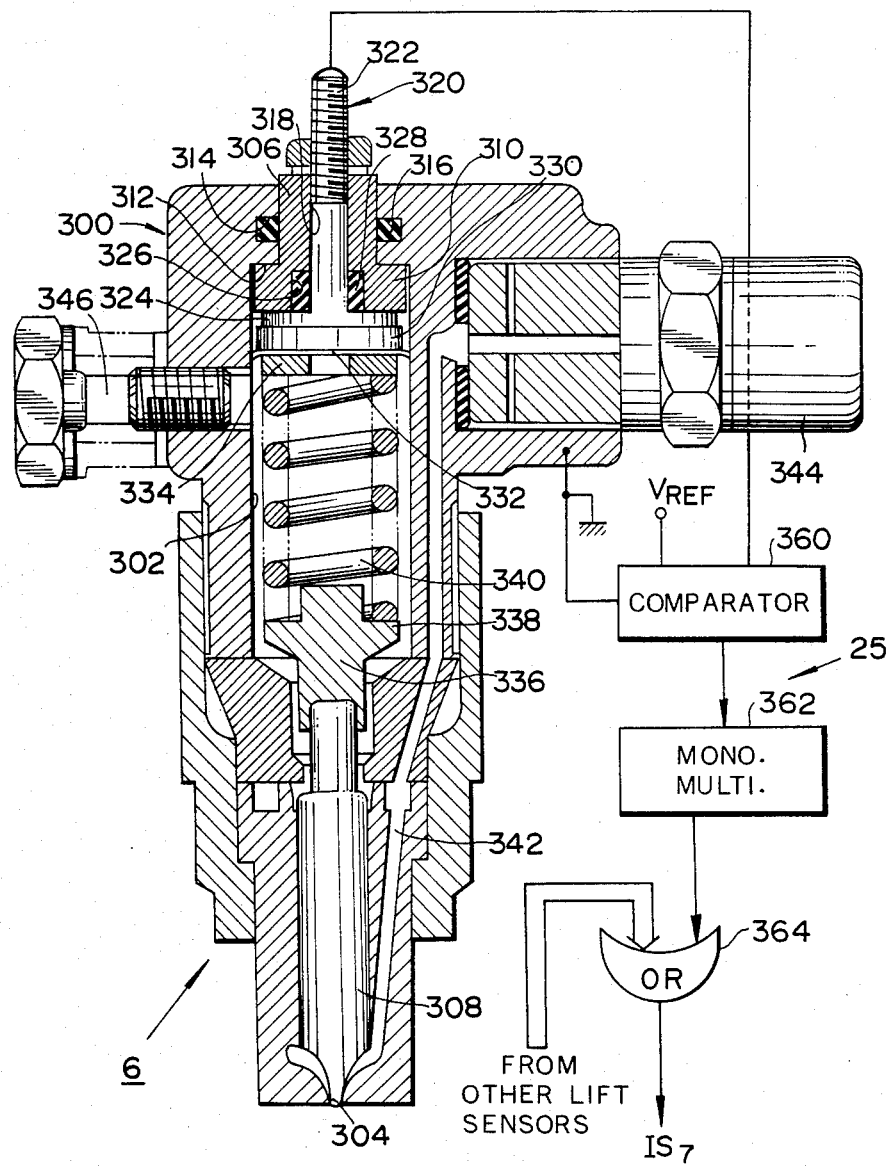
FIG. 3 is a diagram of the lift sensor of FIG. 1 including a longitudinal section view of the fuel injection nozzle of FIG. 1.

In FIG. 3 are shown details of one of the fuel injection nozzles 6, each of which includes a lift sensor 25. The injection nozzle 6 has a body 300 approximately in the form of a cylinder with upper and lower ends. The nozzle body 300 is provided with a coaxial hole or bore 302 extending therethrough. The walls of the nozzle body 300 defining the lower end of the hole 302 taper radially into the hole 302 in such a manner as to form an injection orifice 304 as the lower end of the hole 302. The upper end of the hole 302 is closed by a cylindrical insulating member 306 coaxially fitting into the upper end of the hole 302.

A solid cylindrical valve needle 308 is coaxially, slideably disposed in the lower part of the hole 302. The outside diameter of the valve needle 308 is essentially equal to the diameter of the lower part of the hole 302 so that the valve needle 308 will be essentially in sealing contact with the nozzle body 300. The lower end of the valve needle 308 tapers and normally fits into the orifice 304 to abut the inner surfaces of the nozzle body 300 defining the orifice 304 in order to block the latter. Axial movement of the valve needle 308 away from the orifice 304, that is, lift of the valve needle 308, causes the orifice 304 to be opened.

The insulating member 306 has a radial flange 310 at the lower end thereof within the hole 302. The wall of the nozzle body 300 defining the upper end of the hole 302 is provided with a radial shoulder 312 and a circumferential groove 314 above the shoulder 312. The flange 310 abuts the shoulder 312 to limit axially upward movement of the insulating member 306. A sealing ring 316 is located in the groove 314 and abuts against both the nozzle body 300 and the insulating member 306 in order to prevent fuel leakage through the upper end of the hole 302.

The insulating member 306 also has a coaxial hole 318 extending through it. An electrode 320 has a shaft 322 and a disc flange 324 extending radially from one end of the shaft 322. The electrode 320 is arranged in such a manner that the flange 324 is positioned coaxially within the hole 302 immediately below the insulating member 306 and that the shaft 322 snugly passes through the hole 318. The flange 324 abuts against the lower end surface of the insulating member 306 to limit axially upward movement of the electrode 320. The flange 324 is not in contact with the nozzle body 300. The insulating member 306 electrically isolates the electrode 320 from the nozzle body 300. The wall of the insulating member 306 defining the lower end of the hole 318 is provided with a circumferential groove 326 extending axially from the lower end surface of the insulating member 306. A sealing ring 328 is located in the groove 326 and abuts both the insulating member 306 and the electrode 320 in order to prevent fuel leakage through the hole 318.

A disc piezoelectric element 330 is coaxially disposed in the hole 302 immediately below the flange 324 of the electrode 320. The outside diameter of the piezoelectric element 330 is chosen so that the element 330 does not contact the nozzle body 300 in order to be electrically and mechanically isolated from the latter. The piezoelectric element 330 is sandwiched between the flange 324 and a grounding plate electrode 332 disposed in the hole 302. The upper surface of the piezoelectric element 330 contacts the electrode 320, and the lower surface thereof contacts the other electrode 332. The periphery of the electrode 332 contacts the circumferential inner surfaces of the nozzle body 300 defining the hole 302 so that the electrode 332 is electrically connected to the nozzle body 300.

A ring 334 is coaxially disposed in the hole 302 immediately below the electrode 332. A solid cylindrical fitting 336 is coaxially secured to the upper end of the valve needle 308 within the hole 302. The fitting 336 has a radially extending annular flange 338. A compression helical spring 340 disposed in the hole 302 is seated between the flange 338 and the ring 334. The spring 340 urges the fitting 336 and the valve needle 308 downwards to normally bring the lower end of the valve needle 308 into contact with the inner surfaces of the nozzle body 300 defining the orifice 304 and thus block the orifice 304. The spring 340 urges the ring 334, the electrode 332, the piezoelectric element 330, the flange 324 of the electrode 320, and the flange 310 of the insulating member 306 upwards against the shoulder 312 of the nozzle body 300. The electrode 332 is designed so as to transmit mechanical force between the ring 334 and the piezoelectric element 330 while maintaining electrical contact with the nozzle body 300.

A fuel passage 342 is provided within the walls of the nozzle body 300. One end of the fuel passage 342 communicates with the delivery port 45 in the fuel injection pump (see FIG. 2) via a suitable fuel line (not shown) and a fuel inlet 344 secured to the nozzle body 300. The fuel injection pump 7 supplies pulsatively pressurized fuel to the fuel passage 342. The other end of the fuel passage 342 opens into the lower end of the hole 302 at such a position that the pressure of fuel introduced into the lower end of the hole 302 via the fuel passage 342 will be applied to the tapered surfaces of the lower end of the valve needle 308 to exert an upwardly directed force on the valve needle 308.

A vent or drain 346 is secured to the nozzle body 300. The drain 346 communicates with the hole 302 above the valve needle 308 to allow fuel which has leaked from the lower end of the hole 302 along the periphery of the valve needle 308 to exit the nozzle body 300.

When the pressure of the fuel introduced into the lower end of the hole 302 exceeds a predetermined level, the valve needle 308 is moved up or lifted against the force of the spring 340, thereby opening the orifice 304 to allow fuel injection therethrough. When the pressure of fuel drops below the predetermined level, the valve needle 308 drops back or returns to its normal position, blocking the orifice 304 to interrupt fuel injection. Lift of the valve needle 308 depends on the pressure of fuel introduced into the lower end of the hole 302 and thus on the fuel pressure applied to the tapered surfaces of the lower end of the valve needle 308.

The nozzle body 300 is mounted onto the cylinder head of the engine in a conventional manner in which the injection orifice 304 opens into the swirl combustion chamber 4 (see FIG. 1) to allow fuel to be injected into the swirl chamber 4.

As the valve needle 308 moves up and down to initiate and interrupt fuel injection, the force exerted on the piezoelectric element 330 varies because the force due to the pulsatile fuel pressure is transmitted to the piezoelectric element 330 via the valve needle 308, the fitting 336, the spring 340, the ring 334, and the electrode 332. Variations in the force exerted on the piezoelectric element 330 cause the piezoelectric element 330 to produce a varying electromotive force reflecting the mechanic force. The resulting voltage across the piezoelectric element 330 is coupled to an output lead via the electrode 320, the electrode 332 and the nozzle body 300. Toward this end, the nozzle body 300 is made of an electrically conductive material. The voltage across the piezoelectric element 330 rises and drops as the force transmitted thereto increases and decreases, that is, as the valve needle 308 moves up and down. In other words, the voltage across the piezoelectric element 330 varies in accordance with the variation of lift of the valve needle 308.

The first input terminal of a comparator 360 is electrically connected to the electrode 320 to receive the voltage across the piezoelectric element 330. In this case, the grounding terminal of the comparator 360 is electrically connected to the nozzle body 300 which is gruonded. The second input terminal of the comparator 360 is supplied with a reference voltage $V_{REF}$. The comparator 360 derives a digital signal which is high when the voltage across the piezoelectric element 330 is greater than the reference voltage $V_{REF}$ and is low otherwise. The reference voltage $V_{REF}$ is chosen so that each rising variation in the output of the comparator 360 occurs when lift or upward movement of the valve needle 308 starts, and that each falling variation therein occurs when lift or downward movement of the valve needle 308 ends.

The input terminal of a monostable multivibrator 362 is connected to the output terminal of the comparator 360. Each rising variation in the output of the comparator 360 triggers the multivibrator 362 to derive a short positive pulse. The rising edge of each pulse of the output of the multivibrator 362 occurs when lift or upward movement of the valve needle 308 starts, and thus indicates the start time of each lift of the valve needle 308, that is, the start time of each fuel injection stroke.

Each of the fuel injection nozzles 6 includes a lift sensor 25 identical to that described above. The output terminals of the respective lift sensors 25, that is, those of the respective multivibrators 362 are connected to input terminals of an OR gate 364. The output of the OR gate 364 constitutes the fuel injection start signal $IS_7$, which indicates the start of each fuel injection stroke in any of the fuel injection nozzles 6. The output terminal of the OR gate 364 is connected to the I/O section 31 of the control unit 27 (see FIG. 1) to feed the fuel injection start signal $IS_7$ thereto.

The lift sensor 25 may also be of a different type including a pressure responsive actuator, a switch operated by the actuator, and a d.c. power source electrically connected in series with the switch. In this case, the actuator is designed to respond to the pressure in the fuel passage 342 such that the switch is closed to transmit the voltage from the power source when the pressure in the fuel passage 342 rises to a predetermined level representing the beginning of a fuel injection stroke. Thus, the change in the voltage transmitted via the switch occurs when the fuel injection stroke starts. The voltage transmitted via the switch is used as the fuel injection start signal $IS_7$.

Figure 4:
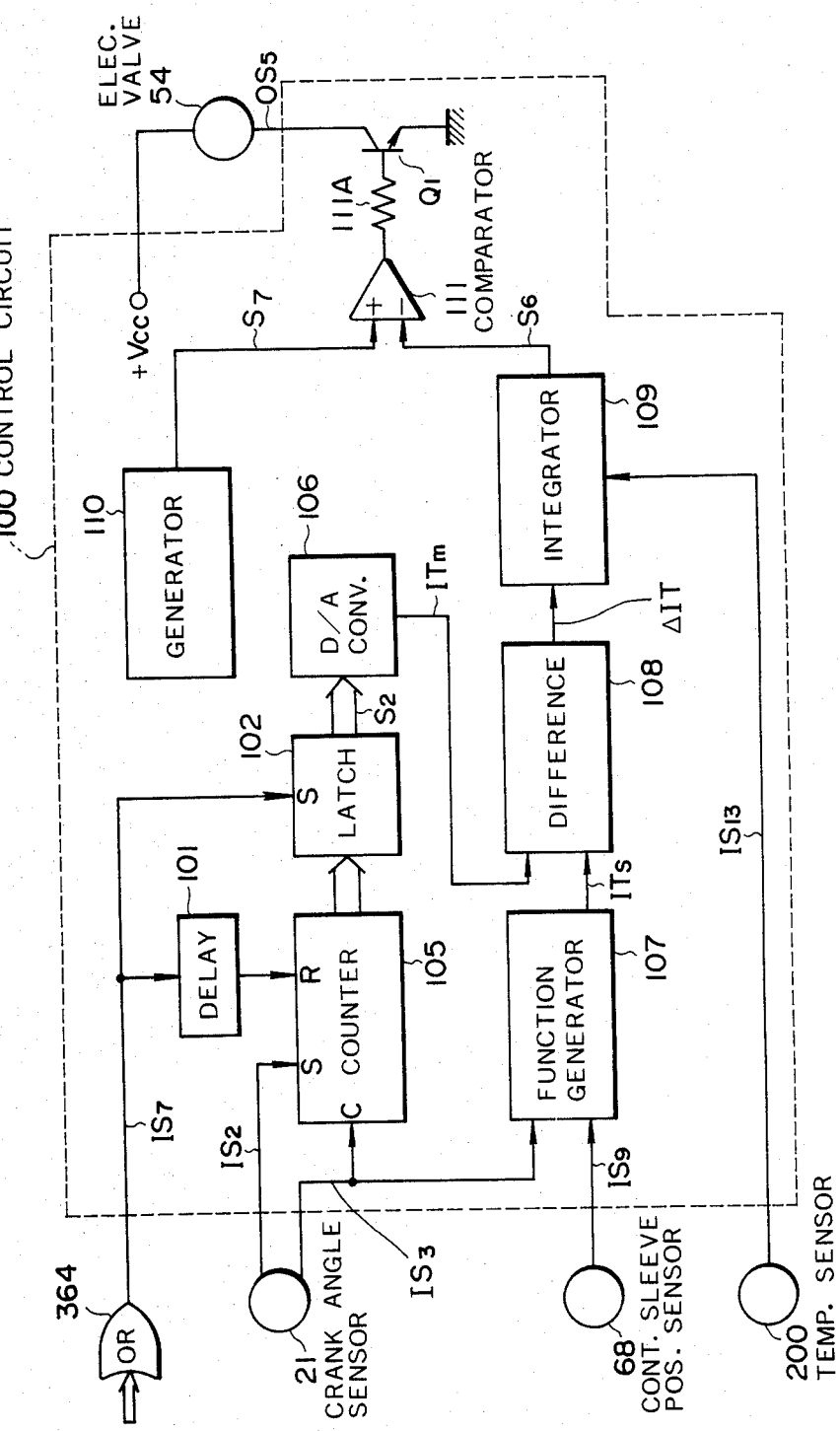
FIG. 4 is a diagram of a fuel injection timing closed-loop control circuit incorporated in the input/output section of the control unit of FIG. 1.

In FIG. 4 are shown details of a novel closed-loop fuel injection timing control circuit 100 incorporated in the I/O section 31 of the control unit 27 (see FIG. 1). The control circuit 100 includes a counter 105. The input or clock terminal of the counter is connected to the crank angle sensor 21 to receive the 1° pulse signal $IS_3$ therefrom. The set terminal of the counter 105 is connected to the crank angle sensor 21 to receive the 120° pulse signal $IS_2$ therefrom. The reset terminal of the counter 105 is connected to the output terminal of the OR gate 364 (see FIG. 3) via an extremely-short time delay circuit 101 to receive the fuel injection start signal $IS_7$. The counter 105 is set by each pulse of the 120° crank angle signal $IS_2$ and is reset by each pulse of the fuel injection start signal $IS_7$. The counter 105 counts the pulses of the 1° crank signal $IS_3$. As a result, the number output by the counter 105 immediately before being reset is equal to the number of the pulses of the 1° crank angle signal $IS_3$ received by the counter during the period between a predetermined time defined by the 120° crank angle signal $IS_2$ and the start of fuel injection stroke indicated by the fuel injection start signal $IS_7$. Thus, the number representing output signal of the counter 105 immediately before being reset essentially coincides with the period between the predetermined time and the start of fuel injection stroke calculated in units or terms of crank angle, and therefore indicates the fuel injection timing with respect to the reference crank angle defined by the 120° signal $IS_2$ in units or terms of crank angle.

The output terminal of the counter 105 is connected to the input terminal of a latch circuit 102 to feed the number representing output signal of the counter 105 thereto. The strobe or control terminal of the latch circuit 102 is directly connected to the output terminal of the OR gate 364 to receive the fuel injection start signal $IS_7$. The latch circuit 102 samples the number representing signal derived by the counter 105 in response to each pulse of the signal $IS_7$, and holds it until receiving the subsequent pulse of the signal $IS_7$. The delay circuit 101 is designed to delay the transmission of the fuel injection start signal $IS_7$ to the counter 105 by a predetermined short time so that the latch circuit 102 can sample the number output by the counter 105 immediately before being reset. In this way, the latch circuit 102 derives a signal $S_2$ indicating the fuel injection timing with respect to the reference crank angle. The delay time defined by the circuit 102 is chosen to be sufficiently shorter than the minimum intervals of the pulses of the 1° crank angle signal $IS_3$, in order to prevent the delay of the signal $IS_7$ from affecting the accuracy of the fuel injection timing measurement with respect to the reference crank angle by the counter 105 and the latch circuit 102.

The output terminals of the latch circuit 102 are connected to the input terminals of a digital-to-analog converter 106 to feed the fuel injection timing signal $S_2$ thereto. The converter 106 generates a voltage signal ITm in response to the signal $S_2$. Specifically, the voltage of the signal ITm is proportional to the fuel injection timing indicated by the signal $S_2$, that is, the period between the onset of fuel injection and the reference crank angle measured in units of crank angle.

Figure 5:
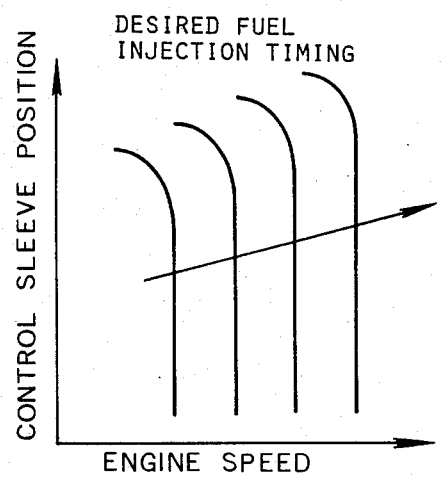
FIG. 5 is a graph showing the characteristics of the output of the function generator in FIG. 4.

The control circuit 100 includes a function generator 107. The first input terminal of the function generator 107 is connected to the crank angle sensor 21 to receive the 1° pulse signal $IS_3$. The second input terminal of the function generator 107 is connected to the potentiometer 68 (see FIG. 2) to receive the control sleeve position signal $IS_9$. The function generator 107 derives a voltage signal ITs in response to the signals $IS_3$ and $IS_9$. Specifically, the voltage of the signal ITs varies as a function of the position of the control sleeve 60 (see FIG. 2) and the engine rotational speed. Note that the frequency of the pulses of the crank angle signal $IS_3$ is proportional to the engine rotational speed. As shown in FIG. 5, the voltage of the signal $IS_3$ essentially increases in proportion to the engine rotational speed, and essentially first remains constant and then decreases according to the displacement of the control sleeve 60 in the direction of increasing the fuel injection quantity. In FIG. 5, the curves are contour lines of the voltage of the signal $IS_3$, which increases in the direction denoted by the illustrated arrow. The function generator 107 is designed so that the voltage of the signal ITs coincides with the desired or optimal value of the fuel injection timing.

The function generator 107 may also be of the type generating a signal voltage ITs proportional to the engine rotational speed and independent of the position of the control sleeve 60. In this case, the function generator 107 consists of a frequency-to-voltage converter, having an input terminal connected to the output terminal of the crank angle sensor 21 to receive the 1° pulse signal $IS_3$ so that the converter and thus the function generator 107 generates the signal ITs with a voltage proportional to the frequency of the 1° pulse signal $IS_3$, that is, the engine rotational speed. The connection of the function generator 107 to the control sleeve position sensor 68 is unnecessary in this case. This alternative function generator 107 can be applied to the third, fifth, and sixth embodiments of this invention described hereinafter.

The first input terminal of a difference amplifier 108 is connected to the output terminal of the converter 106 to receive the signal ITm therefrom. The second input terminal of the difference amplifier 108 is connected to the output terminal of the function generator 107 to receive the signal ITs therefrom. The difference amplifier 108 generates a voltage signal $\Delta$IT in response to the signals ITm and ITs. Specifically, the voltage of the signal $\Delta$IT equals the voltage of the signal ITs minus the voltage of the signal ITm. Thus, the signal $\Delta$IT coincides with the difference between the desired fuel injection timing and the actual fuel injection timing indicated by the signals ITs and ITm, respectively.

The input terminal of an integrator 109 is connected to the output terminal of the difference amplifier 108 to receive the signal $\Delta$IT therefrom. The integrator 109 has a control terminal, which is connected to the fuel temperature sensor 200 to receive the signal $IS_{13}$ indicative of the temperature of fuel in the fuel injection pump 7 (see FIGS. 1 and 2). The integrator 109 integrates the signal $\Delta$IT with an integral action time, a reset time, or a time constant of integral or integration which changes according to the voltage applied to the control terminal thereof, that is, the temperature of fuel. In this case, the voltage output of the integrator 109 forms a signal $S_6$ representing the integral of the signal $\Delta$IT.

The first input terminal of a comparator 111 is connected to the output terminal of the integrator 109 to receive the signal $S_6$ indicative of the integral of the signal $\Delta$IT. The second input terminal of the comparator 111 is connected to the output terminal of a generator 110 to receive the output therefrom. The generator 110 produces a dither signal or a constant-frequency voltage signal $S_7$ of uniformly triangular waveform. The comparator 111 derives a pulse signal, which is high when the voltage of the integral signal $S_6$ is smaller than that of the triangular signal $S_7$ and is low at other times. Therefore, the duty cycle of the output of the comparator 111 depends on the voltage of the integral signal $S_6$.

The base of an NPN transistor $Q_1$ is connected to the output terminal of the comparator 111 via a resistor 111A to receive the output therefrom. The collector of the transistor $Q_1$ is electrically connected via the electromagnetic valve 54 to the positive terminal of a d.c. power source, having a negative ground terminal. The emitter of the transistor $Q_1$ is grounded. When the output of the comparator 111 goes high, the transistor $Q_1$ becomes conductive, energizing the electromagnetic valve 54. When the output of the comparator 111 goes low, the transistor $Q_1$ becomes nonconductive, de-energizing the electromagnetic valve 54. In this case, the combination of the d.c. power source and the transistor $Q_1$ derives the control signal $OS_5$, which is transmitted to the electromagnetic valve 54 and has essentially the same form as the output of the comparator 111. Since the duty cycle of the output of the comparator 111 depends on the voltage of the integral signal $S_6$, the duty cycle of the control signal $OS_5$ depends on the voltage of the integral signal $S_6$.

The integrator 109, the comparator 111, the generator 110, and the electromagnetic valve 54 (see FIG. 1) are designed so that when the actual fuel injection timing indicated by the signal Itm deviates from the desired value indicated by the signal ITs, the duty cycle of the control signal $OS_5$ varies usually in the direction of making the actual fuel injection timing approach the desired value. The integration by the integrator 109 eliminates offset in the closed-loop control of the fuel injection timing. The integral action time or the time constant of integration defined by the integrator 109 determines the response time and the stability of the closed-loop control.

Figure 6:
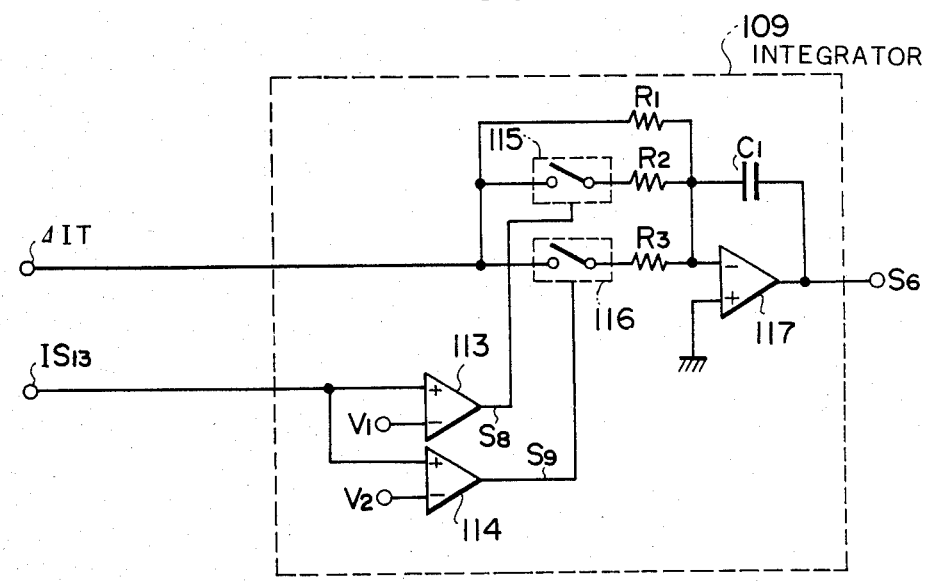
FIG. 6 is a schematic diagram of the integrator of FIG. 4.

In FIG. 6 are shown details of the integrator 109, which includes comparators 113 and 114. The first input terminals of the comparators 113 and 114 are supplied with reference voltages $V_1$ and $V_2$, respectively. The reference voltage $V_1$ is set lower than the other reference voltage $V_2$. The second input terminals of the comparators 113 and 114 are connected to the temperature sensor 200 (see FIGS. 1, 2, and 4) to receive the fuel temperature signal $IS_{13}$. The comparator 113 generates a binary signal $S_8$, which is high when the voltage of the signal $IS_{13}$ is equal to or greater than the reference voltage $V_1$ and is low otherwise. The comparator 114 generates a similar binary signal $S_9$, which is high when the voltage of the signal $IS_{13}$ is equal to or greater than the reference voltage $V_2$ and is low otherwise.

The integrator 109 includes analog switches 115 and 116, each having a control terminal. Each of the switches 115 and 116 is closed when a high level voltage is applied to the control terminal thereof, and is open when a low level voltage is applied to the control terminal thereof. The control terminals of the switches 115 and 116 are connected to the output terminals of the comparators 113 and 114 to receive the signals $S_8$ and $S_9$, respectively.

The integrator 109 includes an operational amplifier 117, a capacitor $C_1$, and resistors $R_1$, $R_2$, and $R_3$ constituting an integrating section. The inverting input terminal of the amplifier 117 is connected to the output terminal of the difference circuit 108 (see FIG. 4) via the resistor $R_1$. The series combination of the analog switch 115 and the resistor $R_2$ is connected across the resistor $R_1$. The series combination of the analog switch 116 and the resistor $R_3$ is also connected across the resistor $R_1$. The noninverting input terminal of the amplifier 117 is grounded. The output terminal of the amplifier 117 is connected to the inverting input terminal thereof via the capacitor $C_1$. The output terminal of the amplifier 117 is connected to the first input terminal of the comparator 111 (see FIG. 4). This integrating section has or defines a time constant, an integral action time, or a reset time which is proportional to $r \cdot c_1$, where r is the resultant resistance between the inverting input terminal of the amplifier 117 and the output terminal of the difference circuit 108, and $c_1$ is the capacitance of the capacitor $C_1$.

Integral action time or time constant adjustment operation of the integrator 109 is as follows: when the voltage of the fuel temperature signal $IS_{13}$ is lower than the smaller reference voltage $V_1$, both the signals $S_8$ and $S_9$ are low, opening the switches 115 and 116. Opening the switches 115 and 116 causes r to be equal to $r_1$, where $r_1$ is the resistance of the resistor $R_1$.

When the voltage of the fuel temperature signal $IS_{13}$ is equal to or greater than the reference voltage $V_1$ but smaller than the reference voltage $V_2$, the signal $S_8$ is high and the signal $S_9$ is low, closing the switch 115 and opening the switch 116. Closing the switch 115 and opening the switch 116 causes r to be equal to $(r_1 \cdot r_2)/(r_1 + r_2)$, where $r_2$ is the resistance of the resistor $R_2$.

When the voltage of the fuel temperature signal $IS_{13}$ is equal to or greater than the higher reference voltage $V_2$, both the signals $S_8$ and $S_9$ are high, closing the switches 115 and 116. Closing the switches 115 and 116 causes r to be equal to $(r_1 \cdot r_2 \cdot r_3)/(r_1 \cdot r_2 + r_2 \cdot r_3 + r_3 \cdot r_1)$.

In this way, the integral action time, that is, the value proportional to $r \cdot c_1$, decreases stepwise in accordance with increases of the voltage of the fuel temperature signal $IS_{13}$. Since the voltage of the signal $IS_{13}$ increases as the temperature of the fuel decreases, the integral action time decreases with decreases in the temperature of the fuel. Normally, a decrease in the integral action time or the time constant of integration causes the response characteristics of the overall closed-loop control of the fuel injection timing to quicken. As described hereinbefore, decreases in the temperature of fuel in the pump chamber 36 (see FIG. 2) cause the response characteristics of the hydraulically-driven fuel injection timing adjustment mechanism to slow down. The decrease of the integral action time in accordance with the decrease in the temperature of the fuel, thus, compensates for the slowdown of the response characteristics of the hydraulically-driven mechanism due to the decrease in the temperature of the fuel. As the response time of the overall closed-loop control of the fuel injection timing decreases, the closed-loop control becomes less stable. Adjusting the integral action time in accordance with the temperature of the fuel, thus, can reduce or offset the influence of the fuel temperature variations on the response time and the stability of the overall closed-loop control of the fuel injection timing, provided that the resistances of the resistors $R_1$, $R_2$ and $R_3$ are chosen suitably.

Figure 7:
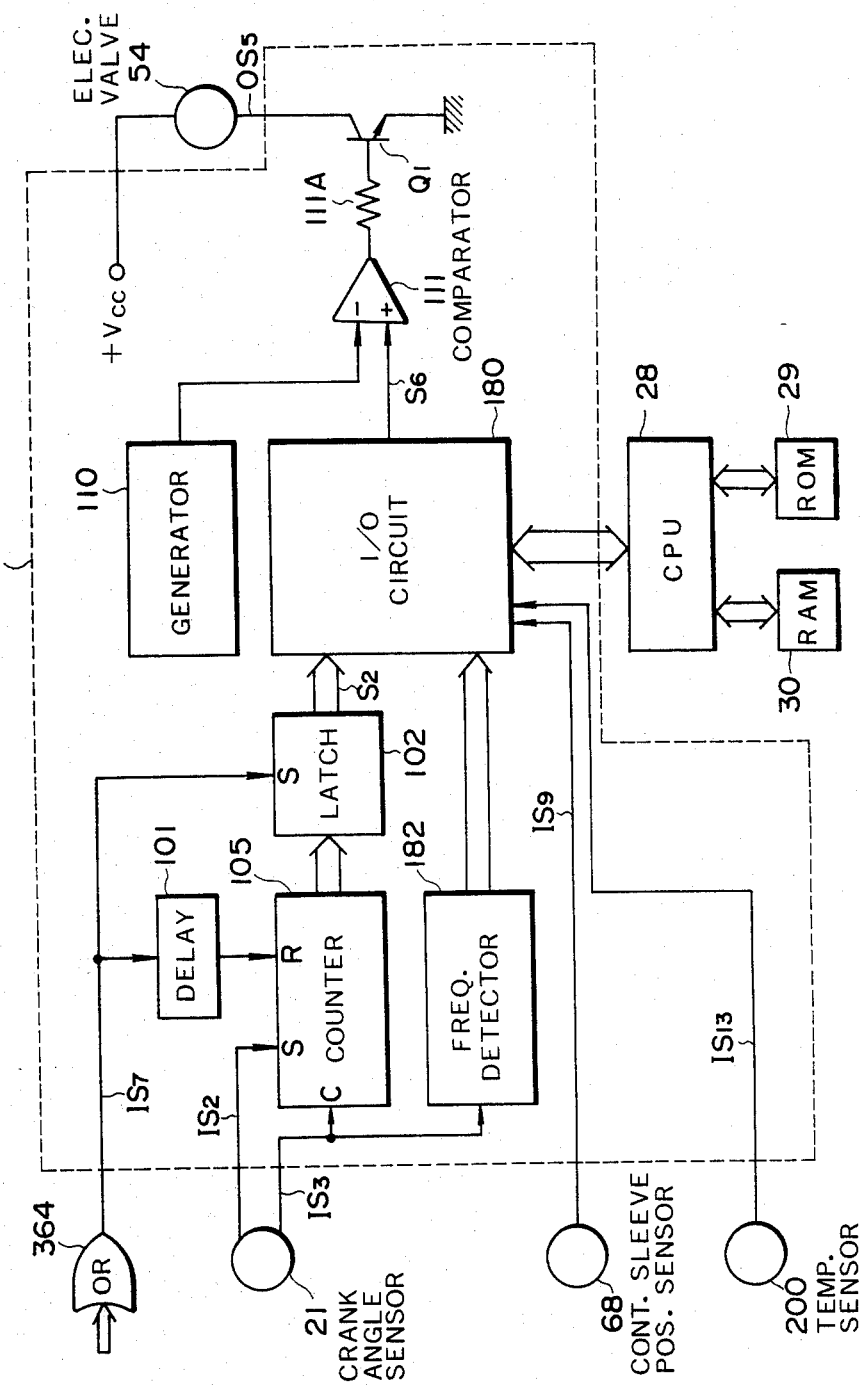
FIG. 7 is a diagram of an essential portion of a fuel injection timing control system according to a second embodiment of this invention.

In FIG. 7 is shown an essential portion of a fuel injection timing control system according to a second embodiment of this invention, which is designed in a manner similar to that of the first embodiment except for arrangements described hereinafter. In the second embodiment, the microcomputer system including the central processing unit 28, the memories 29 and 30, and the input/output circuit (now designated by the reference numeral 180) incorporated in the I/O section 31 constitutes part of the fuel injection timing control system. The central processing unit 28 is connected to the I/O circuit 180, and the memories 29 and 30, as described hereinbefore.

The input terminal of a frequency detector 182 is connected to the output terminal of the crank angle sensor 21 to receive the 1° crank angle signal $IS_3$. The detector 182 monitors the frequency of the signal $IS_3$ which is proportional to the engine rotational speed. The detector 182 outputs a digital signal indicative of the frequency of the signal $IS_3$, that is, the engine rotational speed. The output terminal of the detector 182 is connected to the I/O circuit 180 to feed the engine speed signal thereto.

The output terminal of the latch circuit 102 is connected to the I/O circuit 180 to supply the circuit 180 with the digital output of the latch circuit 102 indicative of the actual fuel injection timing.

The potentiometer 68 (see FIG. 2) is electrically connected to the I/O circuit 180 to supply the control sleeve position signal $IS_9$ thereto. The I/O circuit 180 has an analog-to-digital converter to convert the analog signal $IS_9$ to a corresponding digital signal so that the central processing unit 28 can handle the data indicated by the signal $IS_9$.

The output terminal of the temperature sensor 200 is connected to the I/O circuit 180 to supply the fuel temperature signal $IS_{13}$ thereto. The I/O circuit 180 has another analog-to-digital converter to convert the analog signal $IS_{13}$ to a corresponding digital signal so that the central processing unit 28 can handle the data indicated by the signal $IS_{13}$.

The microcomputer system generates an integral signal $S_6$ in response to the actual fuel injection timing signal from the latch circuit 102, the engine speed signal from the frequency detector 182, the control sleeve position signal $IS_9$, and the fuel temperature signal $IS_{13}$. The integral signal $S_6$ is derived from a digital-to-analog converter incorporated in the I/O circuit 180.

The first input terminal of the comparator 111 is connected to the output terminal of the generator 110, and the second input terminal thereof is connected to the I/O circuit 180 to receive the integral signal $S_6$. The comparator 111 derives a binary signal, which is high when the voltage of the integral signal $S_6$ is greater than the voltage of the output of the generator 110 and is low otherwise.

The OR gate 364, the delay circuit 101, the crank angle sensor 21, the counter 105, and the latch circuit 102 are designed and connected in a manner similar to that of the first embodiment. In addition, the comparator 111, the resistor 111A, the transistor $Q_1$, the electromagnetic valve 54, and the d.c. power source are also electrically designed and connected in a manner similar to that of the first embodiment.

Figure 8:
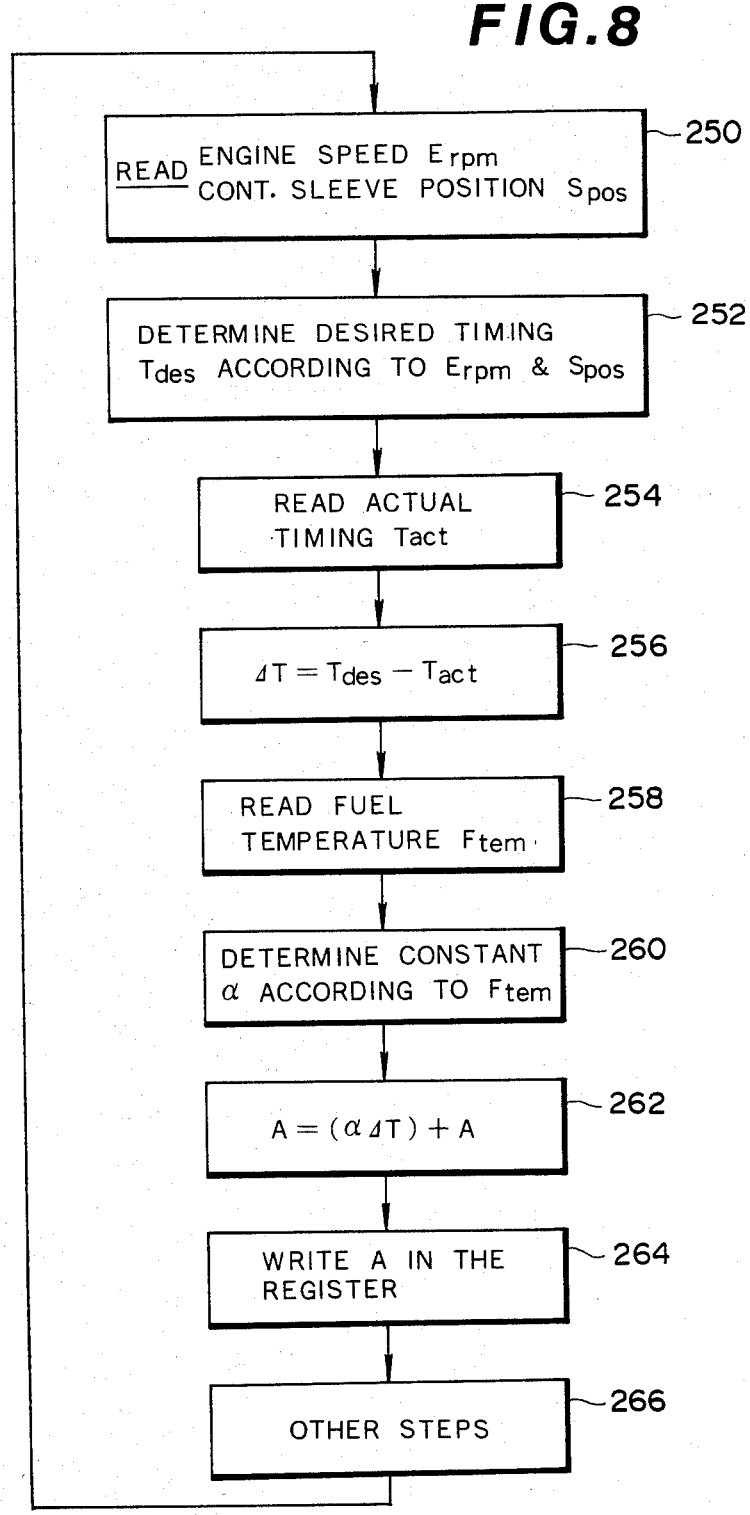
FIG. 8 is a flowchart of operation of the microcomputer system of FIG. 7.

The microcomputer system operates in accordance with a program stored in the memory 29. FIG. 8 is a flowchart of operation of the microcomputer system. In a first step 250, the microcomputer system derives the engine rotational speed $E_{rpm}$ from the output of the frequency detector 182, and also reads the control sleeve position signal $S_{pos}$ indicated by signal $IS_9$, derived by the control sleeve position sensor 68.

After the step 250, operation of the microcomputer system proceeds to a step 252, in which the microcomputer system determines the desired fuel injection timing $T_{des}$ in accordance with the engine rotational speed $E_{rpm}$ and the control sleeve position $S_{pos}$. Specifically, the microcomputer system refers to a table and performs interpolation, if necessary, to determine the desired fuel injection timing $T_{des}$. The table provided in the memory 29 holds or contains a set of values of the desired fuel injection timing, arranged as a function of the engine rotational speed and the control sleeve position.

In a step 254 following the step 252, the microcomputer system reads the actual fuel injection timing $T_{act}$ from the output of the latch circuit 102.

After the step 254, the microcomputer system determines the difference $\Delta T$ between the desired fuel injection timing $T_{des}$ and the actual fuel injection timing $T_{act}$ in a step 256. Specifically, the microcomputer system calculates the value $\Delta T$ which equals the desired timing $T_{des}$ minus the actual timing $T_{act}$.

In a step 258 subsequent to the step 256, the microcomputer system reads the fuel temperature $F_{tem}$ derived from the signal $IS_{13}$ derived by the temperature sensor 200.

After the step 258, the microcomputer system advances to step 260 when it determines a summation factor or constant $\alpha$ in accordance with the fuel temperature $F_{tem}$. Specifically, the microcomputer system refers to a table and performs interpolation, if necessary, to determine the summation constant $\alpha$. The table provided in the memory 29 holds or contains a set of values of the summation constant $\alpha$ arranged as a function of the fuel temperature.

In a step 262 following the step 260, the microcomputer system calculates and updates a variable A which equals the summation constant $\alpha$ times the difference $\Delta T$ plus the previous value of the variable A. This is performed by the statement "$A=(\alpha \times \Delta T)+A$". Execution of the step 262 is repeated at essentially constant time intervals, so that the variable A essentially represents the integral of the difference $\Delta T$. In this case, the integral action time or the time constant of integration corresponding to that defined in the first embodiment depends on the summation constant $\alpha$. Variation of the summation constant $\alpha$ in accordance with the fuel temperature $F_{tem}$ is basically chosen so that the integral action time decreases as the fuel temperature drops. Since an increase in the summation constant $\alpha$ results in a decrease in the integral action time, the values of the summation contant $\alpha$ should be chosen so as to increase in accordance with a decrease in the fuel temperature $F_{tem}$.

After the step 262, the microcomputer system writes the value of the variable A in a register in the I/O circuit 120 in a step 264. The output terminal of the register is connected to the digital-to-analog (D/A) converter associated with the comparator 111. In this case, the D/A converter generates an analog signal, that is, the integral signal $S_6$ whose voltage is proportional to the value of the variable A written and held in the register.

After the step 264, operation of the microcomputer system returns to the step 250 by way of a step 266, in which the microcomputer system executes a program which determines the values of other control signals $OS_1$, $OS_2$, $OS_3$, $OS_4$, $OS_6$, and $OS_7$ (refer to the first embodiment). Thus, the microcomputer system executes the series of the above steps repeatedly at an essentially constant period or cycle. This ensures that execution of the step 262 is repeated at essentially constant intervals. In the step 264, the microcomputer system updates the value stored in the register by writing the value of the variable A therein. In this case, the register holds the new value of the variable A instead of the previous value thereof until the microcomputer system writes the next value thereof in the register.

Figure 9:
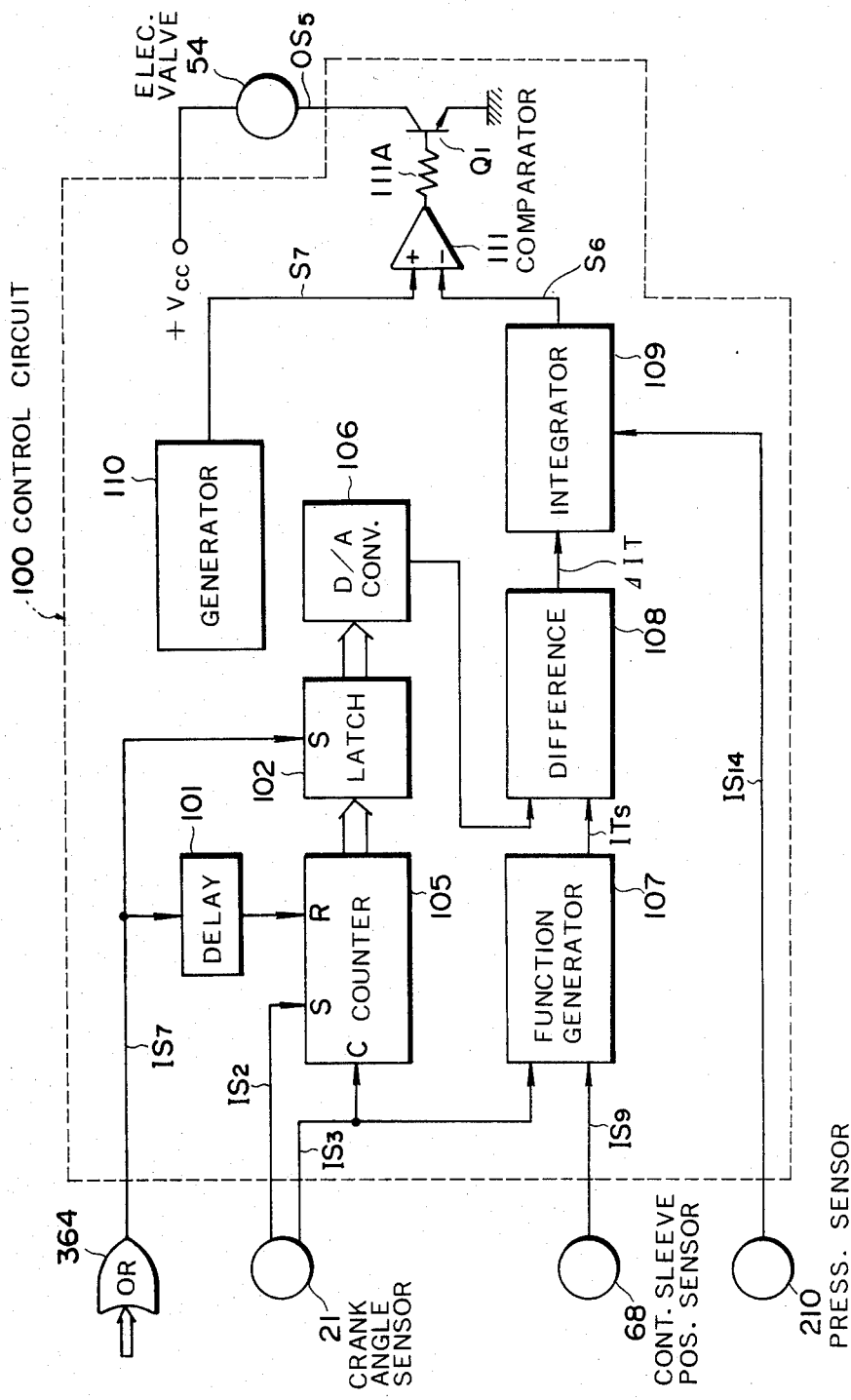
FIG. 9 is a diagram of an essential portion of a fuel injection timing control system according to a third embodiment of this invention.

In FIG. 9 is shown an essential portion of a fuel injection timing control system according to a third embodiment of this invention, which is designed in a manner similar to that of the first embodiment except for the following arrangements. The third embodiment has a pressure sensor 210 instead of the temperature sensor 200 (refer to the first embodiment). The pressure sensor 210 is attached to the fuel injection pump 7 (see FIGS. 1 and 2) in such a manner that it can sense the fuel pressure in the pump chamber 36. The pressure sensor 210 generates a voltage signal $IS_{14}$, the amplitude of which increases as the fuel pressure in the pump chamber 36 falls. The output terminal of the pressure sensor 210 is connected to the control terminal of the integrator 109 to feed the fuel pressure signal $IS_{14}$ thereto. Since the integrator 109 is similar to that of the first embodiment, the integral action time or the time constant of integration used or defined by the integrator 109 decreases in accordance with decreases in the fuel pressure in the pump chamber 36. The flow speed of fuel or working fluid in the hydraulically-driven fuel injection timing adjustment mechanism (refer to the first embodiment) decreases as the pressure of fuel or working fluid drops. Since the fuel or working fluid in the mechanism passes through the pump chamber 36, the pressure of fuel or working fluid in the mechanism roughly decreases with the pressure in the pump chamber 36. Therefore, the flow speed of fuel or working fluid in the mechanism decreases as the fuel pressure in the pump chamber 36 drops. The voltage of the fuel pressure signal $IS_{14}$ thus increases as the flow speed of fuel or working fluid in the mechanism decreases. The response of the mechanism slows down as the flow speed of fuel or working fluid therein decreases, while the integral action time decreases in accordance with decreases in the flow speed of fuel or working fluid in the mechanism. Thus, the interrelated response time and stability of the overall closed-loop fuel injection timing control can be held essentially unchanged even when the response characteristics of the fuel injection timing adjustment mechanism vary due to pressure changes of the fuel or working fluid in the mechanism.

Figure 10:
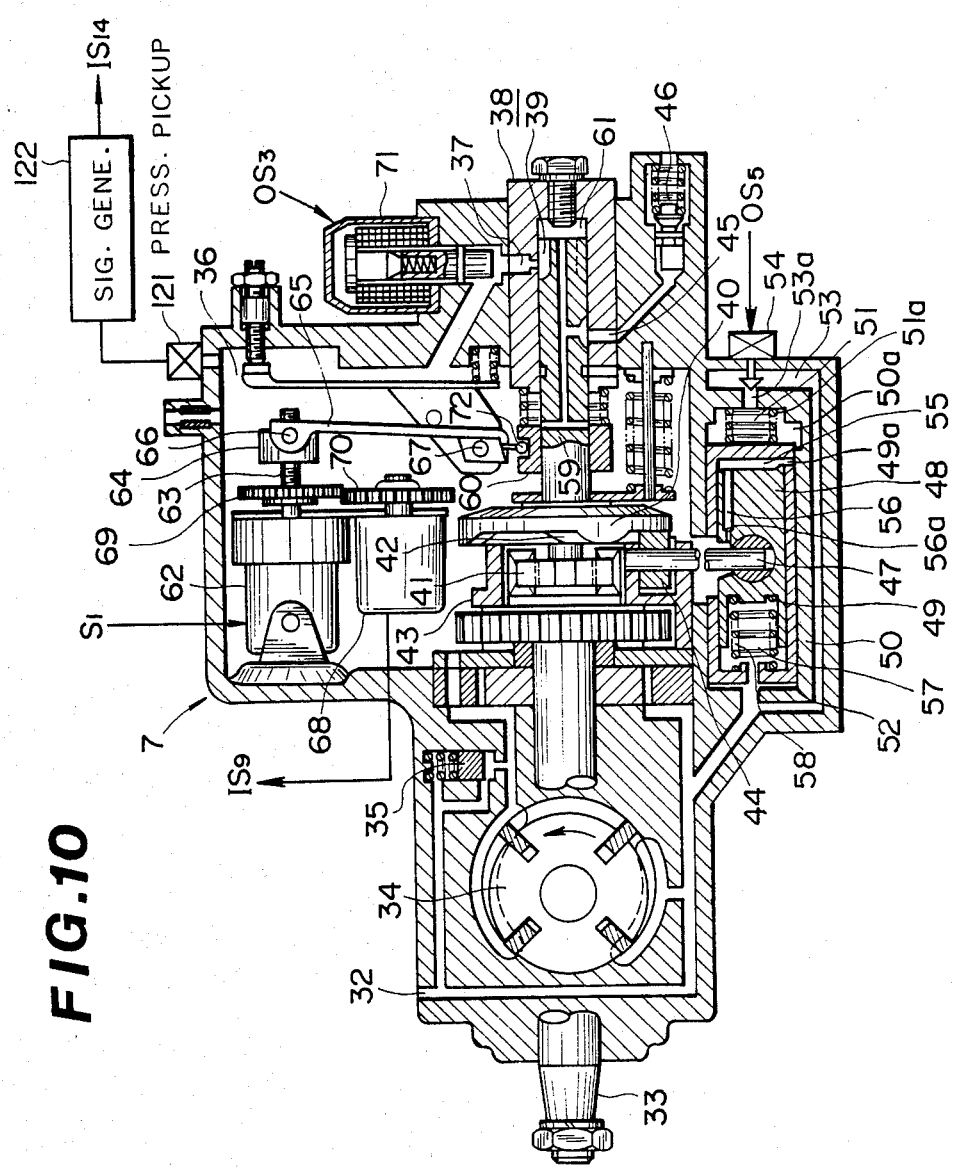
FIG. 10 is a longitudinal section view of a fuel injection pump equipped with the pressure sensor of FIG. 9.

As shown in FIG. 10, the pressure sensor 210 includes a pressure pickup 121 and a pressure-signal generator 122. The pressure pickup 121 is attached to the housing of the fuel injection pump 7 in such a manner as to communicate with the pump chamber 36 via a passage provided through the wall of the housing of the fuel injection pump 7. The pressure pickup 121 generates an electric signal indicative of the pressure in the pump chamber 36. The output terminal of the pressure pickup 121 is electrically connected to the input terminal of the generator 122 to feed the electric signal thereto. In response to the electric signal from the pressure pickup 121, the generator 122 derives the fuel pressure signal $IS_{14}$, with a voltage that increases as the pressure in the pump chamber 36 drops.

The pressure sensor 210 may also be of other types serving as pressure-to-voltage transducers, such as the combination of a pressure responsive device and a potentiometer. In this case, the pressure responsive device is exposed to the pressure in the pump chamber 36, and the connection of the potentiometer and the pressure responsive device is designed so that the voltage output of the potentiometer increases as the pressure in the pump chamber 36 decreases.

Figure 11:
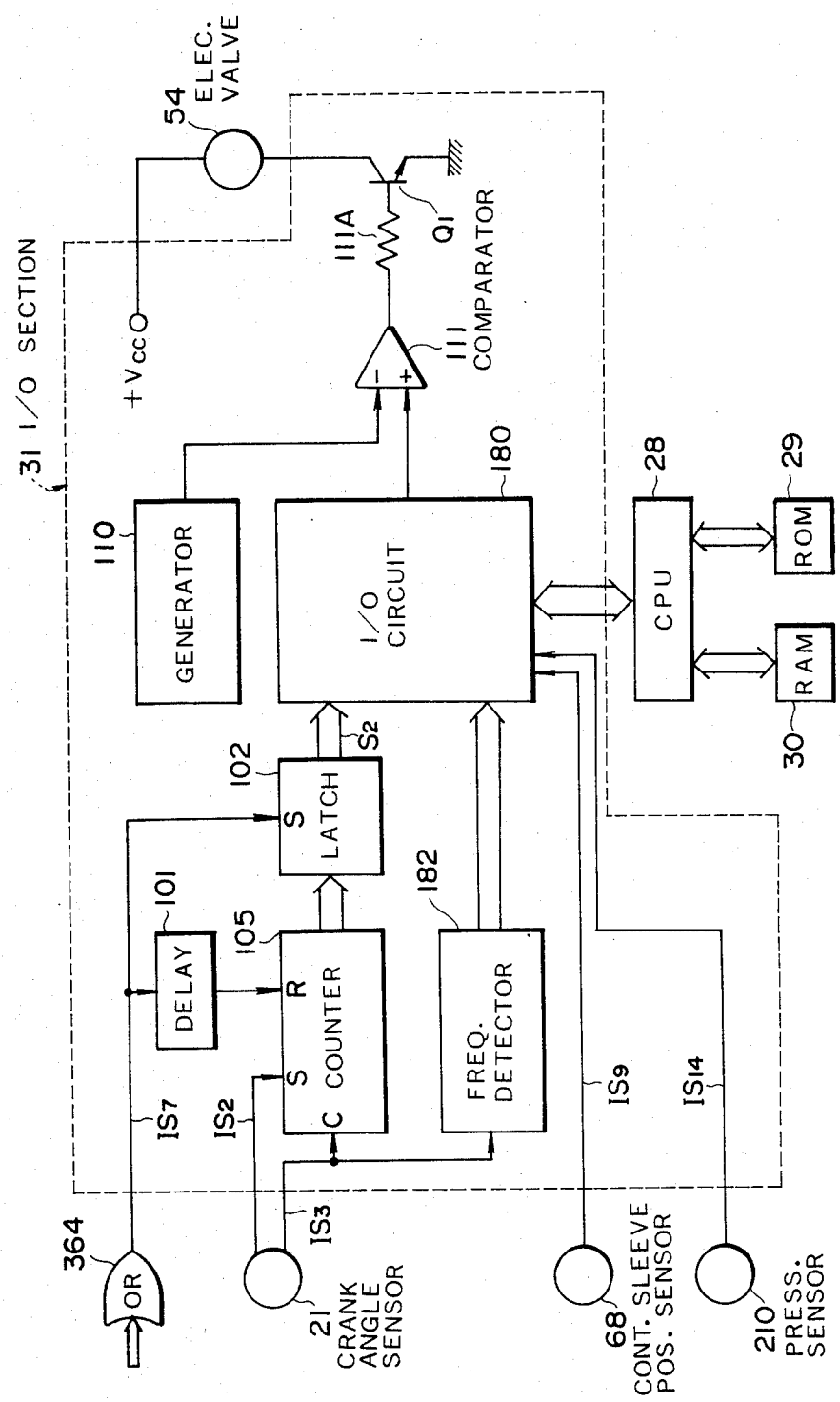
FIG. 11 is a diagram of an essential portion of a fuel injection timing control system according to a fourth embodiment of this invention.

In FIG. 11 is shown an essential portion of a fuel injection timing control system according to a fourth embodiment of this invention, which is designed in a manner similar to that of the second embodiment except for the following arrangements. The fourth embodiment has a pressure sensor 210 instead of the temperature sensor 200. The pressure sensor 210 is identical to that of the third embodiment and generates a fuel pressure signal $IS_{14}$ indicative of the fuel pressure in the pump chamber 36 (see FIGS. 2 and 10). The output terminal of the pressure sensor 210 is connected to the input terminal of the analog-to-digital converter of the I/O circuit 180 to feed the fuel pressure signal $IS_{14}$ thereto. The microcomputer system includes the I/O circuit 180, the central processing unit 28, and the memories 29 and 30 similar to the second embodiment.

Figure 12:
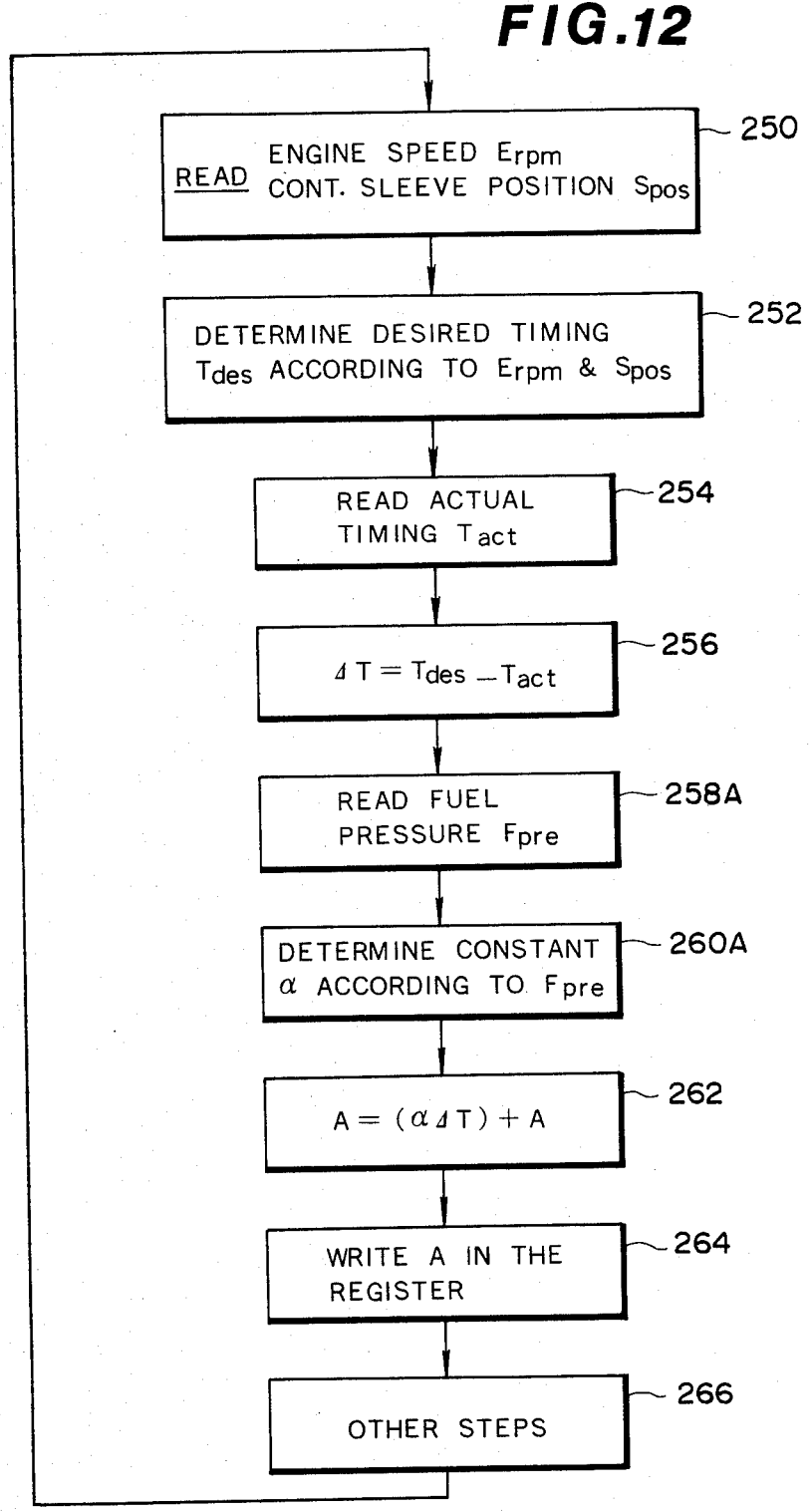
FIG. 12 is a flowchart of operation of the microcomputer system in FIG. 11.

As shown in FIG. 12, the microcomputer system reads the fuel pressure $F_{pre}$ derived from the signal $IS_{14}$ derived by the fuel pressure sensor 210, in a step 258A following the step 256 (refer to the second embodiment). After the step 258A, the microcomputer system advances to step 260A when it determines a summation factor or constant $\alpha$ in accordance with the fuel pressure $F_{pre}$. Specifically, the microcomputer system refers to a table and performs interpolation, if necessary, to determine the summation constant $\alpha$ in the step 260A. The table provided in the memory 29 holds or contains a set of values of the summation constant $\alpha$ arranged as a function of the fuel pressure. Operation of the microcomputer system proceeds to the step 262 (refer to the second embodiment) from the step 260A. Thus, the microcomputer system adjusts the integral action time or the time constant of integration in accordance with the fuel pressure to compensate for the variation in the response characteristics of the hydraulically-driven fuel injection timing adjustment mechanism (refer to the first embodiment) due to variations in the fuel pressure in the pump chamber 36.

Figure 13:
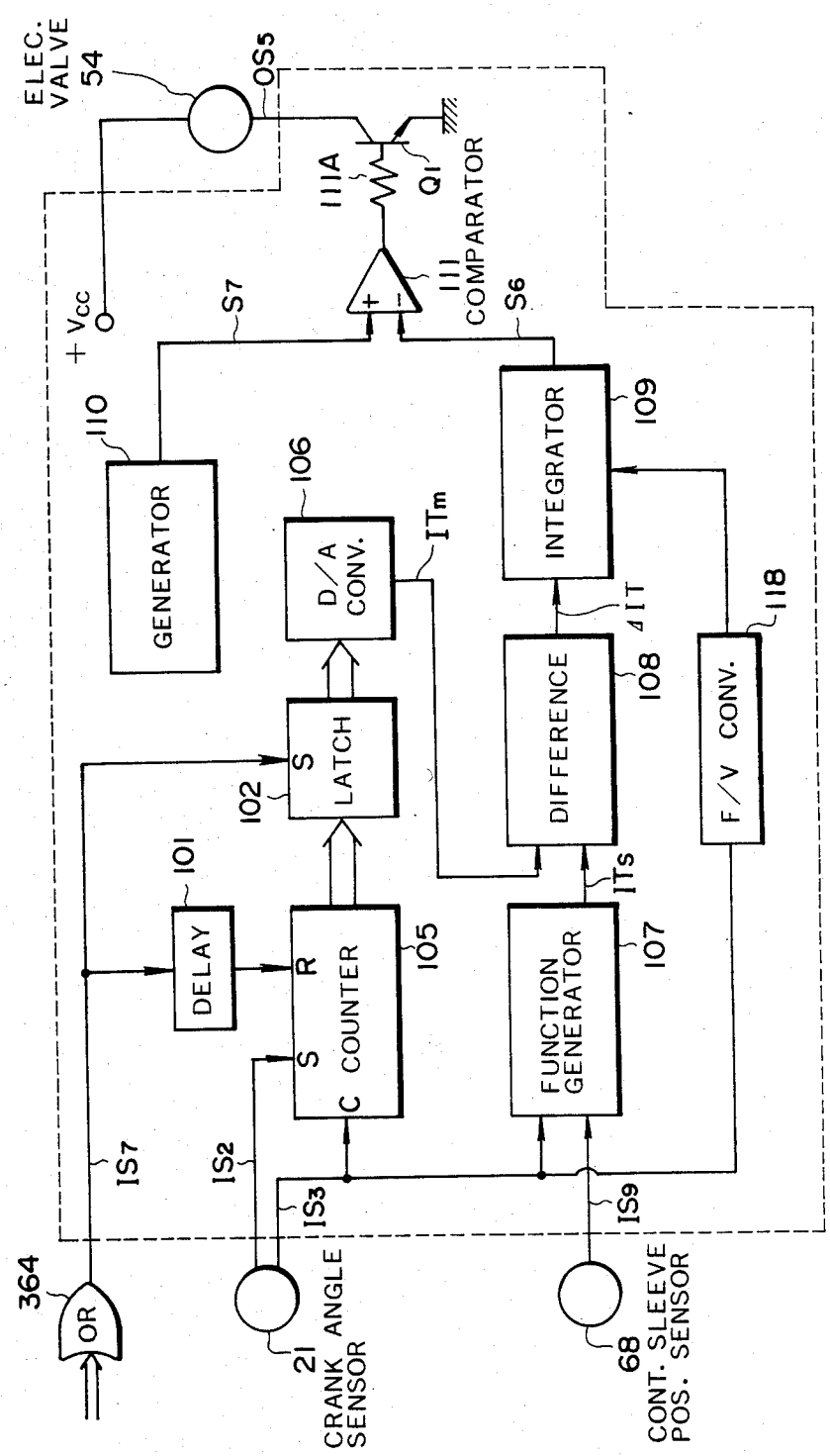
FIG. 13 is a diagram of an essential portion of a fuel injection timing control system according to a fifth embodiment of this invention.
Figure 14:
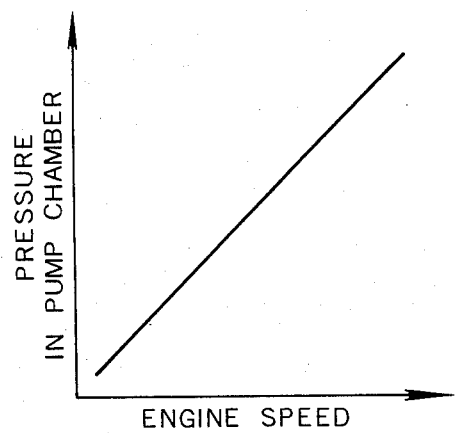
FIG. 14 is a graph showing the relationship between the engine rotational speed and the fuel pressure in the pump chamber of a fuel injection pump.

In FIG. 13 is shown an essential portion of a fuel injection timing control system according to a fifth embodiment of this invention, which is designed in a manner similar to that of the third embodiment except for the following arrangements. The fifth embodiment has a frequency-to-voltage converter 118 instead of the pressure sensor 210 (refer to the third embodiment). The input terminal of the converter 118 is connected to the output terminal of the crank angle sensor 21 to receive 1° pulse signal $IS_3$ therefrom. The converter 118 generates a voltage signal having a magnitude that decreases with increases in the frequency of the 1° pulse signal $IS_{13}$ and thus in the engine rotational speed. As shown in FIG. 14, the fuel pressure in the pump chamber 36 (see FIGS. 2 and 10) is proportional to the engine rotational speed, so that the voltage output of the converter 118 decreases as the fuel pressure in the pump chamber 36 rises. The output terminal of the converter 118 is connected to the control terminal of the integrator 109 to feed the output of the converter 118 thereto. Since the integrator 109 is similar to that of the third embodiment, the integral action time or the time constant of integration decreases in accordance with decreases in the fuel pressure in the pump chamber 36.

Figure 16:
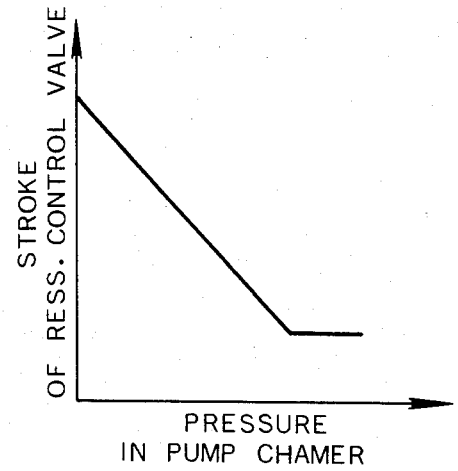
FIG. 16 is a graph showing the relationship between the displacement of the pressure control valve of FIG. 15 and the pressure in the pump chamber of FIG. 15.
Figure 15:
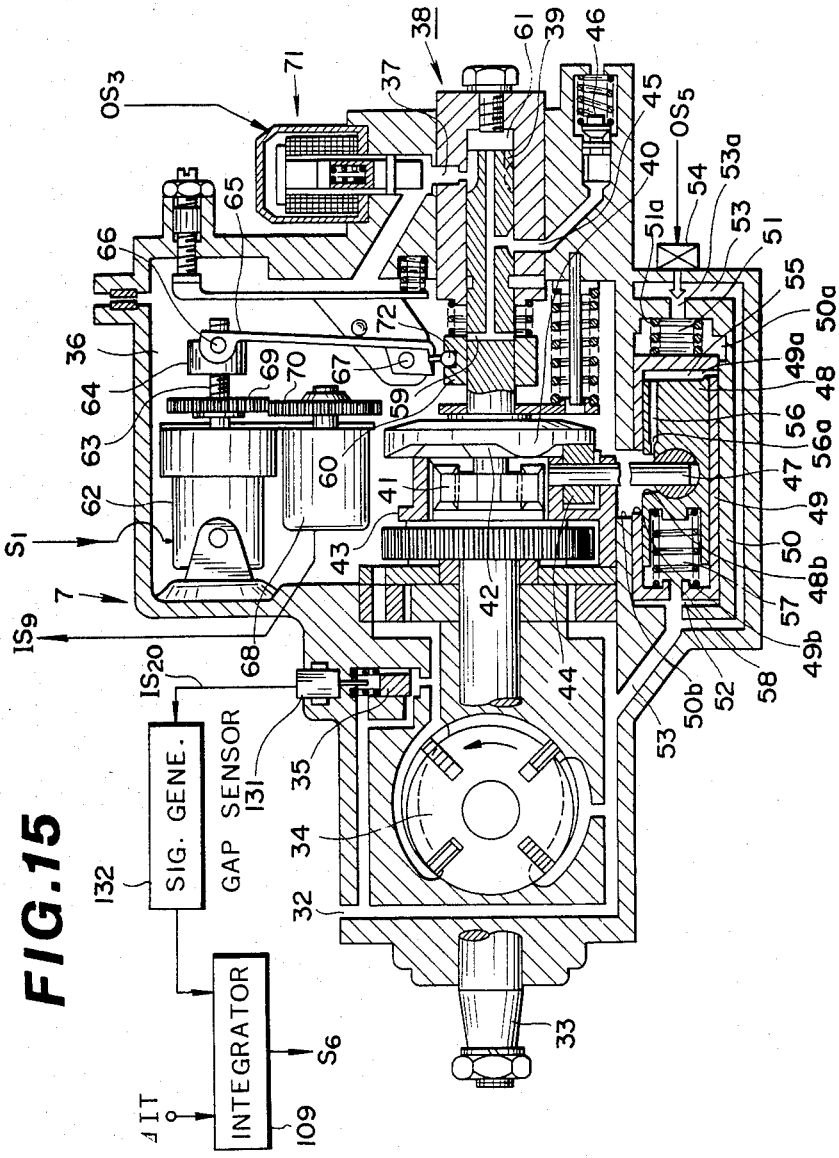
FIG. 15 is a longitudinal section view of a fuel injection pump including a diagram of an essential portion of a fuel injection timing control system according to a sixth embodiment of this invention.

In FIG. 15 is shown an essential portion of a fuel injection timing control system according to a sixth embodiment of this invention, which is designed in a manner similar to that of the third embodiment except for the following arrangements. Instead of the pressure sensor 210 (refer to the third embodiment), the sixth embodiment has a device to measure stroke or displacement of the pressure control valve 35. The measuring device includes a non-contact type displacement measure or gap sensor 131 located near the pressure control valve 35 to measure the gap between the sensor 131 and the valve 35, that is, the displacement of the valve 35. The gap sensor 131 generates a signal $IS_{20}$ indicative of the displacement of the valve 35. As shown in FIG. 16, the displacement of the pressure control valve 35 decreases linearly with increases in the pressure in the pump chamber 36. Therefore, the signal $IS_{20}$ indicates the pressure in the pump chamber 36. The output terminal of the gap sensor 131 is connected to the input terminal of a pressure control valve stroke signal generating circuit 132 to apply the signal $IS_{20}$ thereto. The signal generating circuit 132 generates a voltage signal having a magnitude that increases in accordance with increases in the displacement of the control valve 35 and thus with decreases in the pressure in the pump chamber 36. The output terminal of the signal generating circuit 132 is connected to the control terminal of the integrator 109 to apply the output of the circuit 132 thereto. Since the integrator 109 is similar to that of the third embodiment, the integral action time or the time constant of integration decreases in accordance with decreases in the pressure in the pump chamber 36.

It should be understood that further modifications and variations may be made in this invention without departing from the spirit and scope of this invention as set forth in the appended claims. For example, this invention can be applied to an usual gasoline engine of the type to which fuel is supplied by fuel injection.

What is claimed is:

1. A fuel injection timing control system for an internal combustion engine into which fuel is intermittently injected, the control system comprising:
   (a) first means for controlling the timing of fuel injection by a closed-loop control;
   (b) second means, fluidly-driven and using working fluid, for adjustably determining the fuel injection timing, the second means constituting a part of the closed-loop conrol, wherein the response time and the stability of the closed-loop control depend on a condition of the working fluid;

(c) third means for sensing the condition of the working fluid and generating a signal indicative thereof; and (d) fourth means, responsive to the signal from the third means, for adjusting the response time and the stability of the closed-loop control in accordance with the sensed condition of the working fluid to thereby prevent the influence of the working fluid condition on the response time and the stability of the closed-loop control, the fourth means being another part of the closed-loop control.

2. A fuel injection timing control system as recited in claim 1, wherein the third means senses the temperature of the working fluid as the condition thereof.

3. A fuel injection timing control system as recited in claim 1, wherein the third means senses the pressure of the working fluid as the condition thereof.

4. A fuel injection timing control system for an internal combustion engine into which fuel is intermittently injected, the control system comprising:

(a) first means for controlling the timing of fuel injection by a closed-loop control;

(b) second means, fluidly-driven and using working fluid, for varying the fuel injection timing, the second means being a part of the closed-loop control;

(c) third means for adjustably determining the response time and the stability of the closed-loop control, the third means being another part of the closed-loop control;

(d) fourth means for sensing a condition of the working fluid which can influence the response time and the stability of the closed-loop control, and for generating a signal indicative thereof; and (e) fifth means, responsive to the signal from the fourth means, for adjusting the third means in accordance with the sensed condition of the working fluid so as to reduce the influence of the working fluid condition on the response time and the stability of the closed-loop control, (f) the first means further comprising:
  (i) sixth means for generating a signal indicative of the desired fuel injection timing;
  (ii) seventh means for sensing the actual fuel injection timing and generating a signal indicative thereof; and
  (iii) eighth means, responsive to the signal from the sixth means and the signal from the seventh means, for generating a signal indicative of the difference between the desired fuel injection timing and the actual fuel injection timing;

(g) the third means comprising ninth means, responsive to the signal from the eight means, for generating a signal indicative of the integration of the difference with an integral action time determining the response time and the stability of the closed-loop control; the second means adjusting the fuel injection timing in response to the signal from the ninth means; and the fifth means adjusting the integral action time to adjust the third means.

5. A fuel injection timing control system as recited in claim 4, wherein the ninth means comprises the combination of a resistor and a capacitor supplied with the signal from the eighth means for generating the signal indicative of the integration, the combination having a time constant, and wherein the fifth means adjusts the time constant to adjust the integral action time.

6. A fuel injection timing control system as recited in claim 5, wherein the fifth means adjusts the resistance of the resistor to adjust the time constant.

7. A fuel injection timing control system as recited in claim 4, wherein the ninth means generates a signal indicating the summation of a summation factor times the difference between the desired fuel injection timing and the actual fuel injection timing obtained at equal time-intervals to now as the signal indicative of the integration, and wherein the fifth means adjusts the summation factor to adjust the integral action time.

8. A fuel injection timing control method for an internal combustion engine having a closed-loop fuel injection timing control system, a fluidly-driven device for varying the fuel injection timing, and means for adjustably determining the response time and the stability of the closed-loop control system, the device being a part of the closed-loop control system, the means being another part of the closed-loop control system, the method comprising the steps of:

(a) sensing a condition of the working fluid for the device which can influence the response time and the stability of the closed-loop control system; and (b) adjusting the means in accordance with the sensed condition of the working fluid so as to reduce the influence of the working fluid condition on the response time and the stability of the closed-loop control.

9. A fuel injection timing control system for an internal combustion engine into which fuel is intermittently injected, the control system comprising:

(a) first means for generating a signal indicative of desired fuel injection timing;

(b) second means for sensing actual fuel injection timing and generating a signal indicative thereof;

(c) third means, responsive to the signals from the first and second means, for generating a signal indicative of the difference between the desired fuel injection timing and the actual fuel injection timing;

(d) fourth means, responsive to the signal from the third means, for generating a signal indicative of the integration of the difference with a variable integral action time;

(e) fifth means, responsive to the signal from the fourth means, for adjusting the actual fuel injection timing to the desired fuel injection timing, whereby the fuel injection timing is adjusted by a closed-loop control, the fifth means including a part which is fluidly driven and uses working fluid, wherein the response time and the stability of the closed-loop control depend on both of the integral action time and a condition of the working fluid;

(f) sixth means for sensing the condition of the working fluid and generating a signal indicative thereof; and (g) seventh means, responsive to the signal from the sixth means, for varying the integral action time in accordance with the condition of the working fluid and thereby preventing the influence of the working fluid condition on the response time and the stability of the closed-loop control.

10. A fuel injection timing control system as recited in claim 9, wherein the fourth means comprises the combination of a resistor and a capacitor supplied with the signal from the third means for generating the signal indicative of the integration, the combination having a time constant, and wherein the seventh means adjusts the time constant to vary the integral action time.

11. A fuel injection timing control system as recited in claim 10, wherein the seventh means adjusts the resistance of the resistor to adjust the time constant.

12. A fuel injection timing control system as recited in claim 9, wherein the fourth means generates a signal indicating the summation of a summation factor times the difference between the desired fuel injection timing and the actual fuel injection timing obtained at equal time-intervals as the signal indicative of the integration, and wherein the seventh means adjusts the summation factor to vary the integral action time.

13. The fuel injection timing control system of claim 1 wherein the first means includes an integrator with a time constant having a value controlled in response to the sensed working fluid condition.

* * * * *